United States Patent

[11] 3,591,757

| [72] | Inventor | Wallace C. Rudd |
| --- | --- | --- |
| | | Larchmount, N.Y. |
| [21] | Appl. No | 938 |
| [22] | Filed | Jan. 6, 1970 |
| [45] | Patented | July 6, 1971 |
| [73] | Assignee | AMF Incorporated |
| | | Continuation-in-part of application Ser. No. 510,502, Nov. 30, 1965, now abandoned, and a continuation-in-part of 792,304, Jan. 21, 1969, now abandoned, and a continuation-in-part of 792,644, Jan. 21, 1969, now abandoned. |

[54] WELDING BY HIGH FREQUENCY CURRENT PENETRATION
79 Claims, 91 Drawing Figs.

[52] U.S. Cl. .................................................. 219/67,
219/64, 219/78, 219/86, 219/102, 219/104, 219/117
[51] Int. Cl. ..................................................... B23k 11/02
[50] Field of Search ........................................... 219/100-
−107, 117, 67, 56, 58, 59, 83, 86, 64, 78

[56] References Cited
UNITED STATES PATENTS

| 2,066,668 | 1/1937 | Bennett.......................... | 219/67 X |
| 2,919,342 | 12/1959 | Kohler et al. .................. | 219/67 X |
| 2,919,343 | 12/1959 | Rudd............................. | 219/67 X |
| 2,922,020 | 1/1960 | Andrew......................... | 219/67 |
| 3,073,945 | 1/1963 | Osterer et al. ................ | 219/67 |
| 3,175,069 | 3/1965 | Kohler et al. ................. | 219/59 |

Primary Examiner—J. V. Truhe
Assistant Examiner—L. A. Schutzman
Attorneys—George W. Price and John H. Gallagher ABSTRACT: Methods and apparatus for welding together portions of a metal strip or strips and using high frequency current which penetrates into the metal comprising holding the portions closely adjacent, causing the current to flow in the same direction along both portions and to flow in the opposite direction along a proximity conductor extending along and in close proximity to the portions, and when welding temperature has been reached, forging the heated portions together.

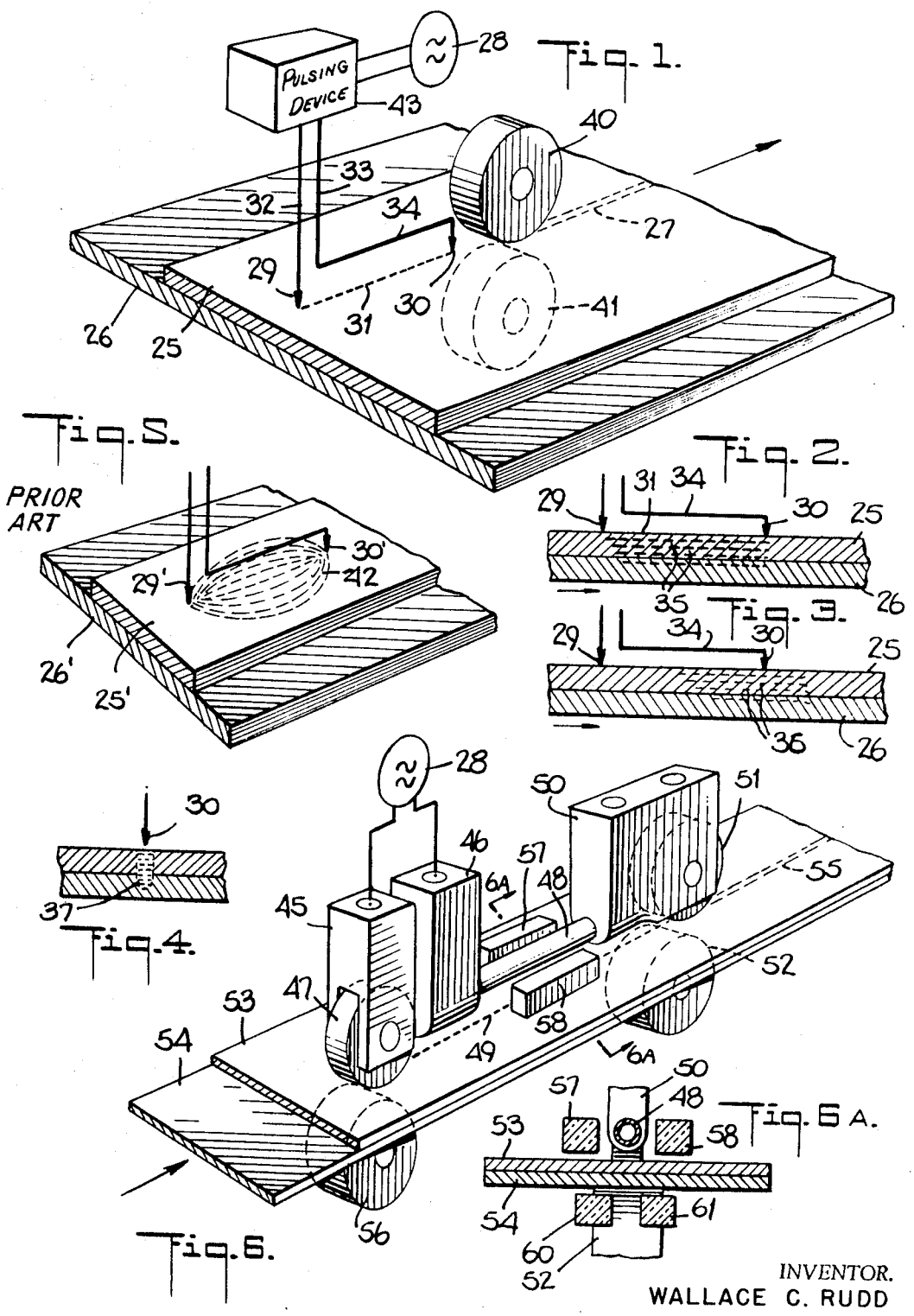

INVENTOR
WALLACE C. RUDD

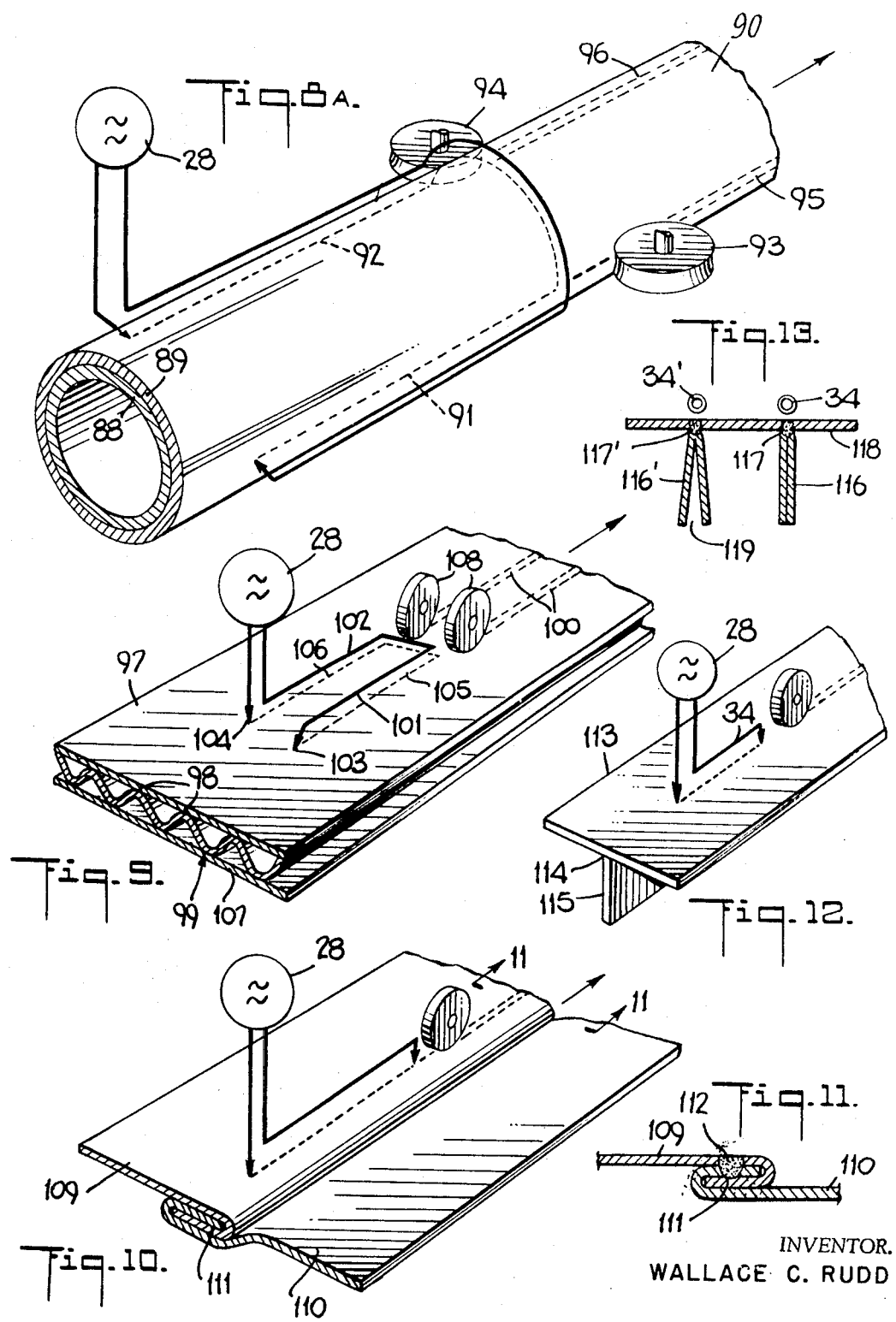

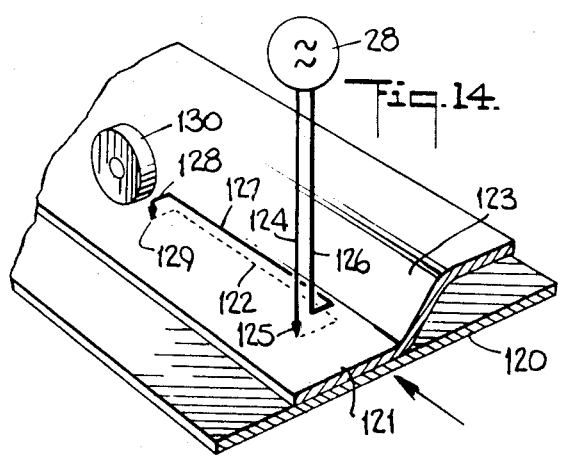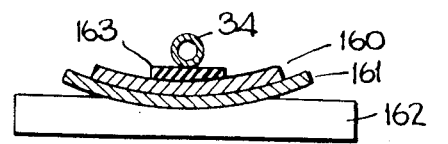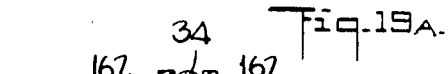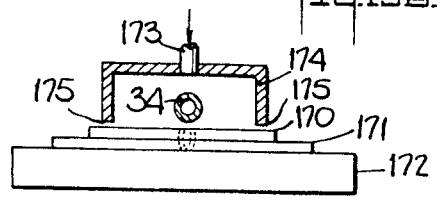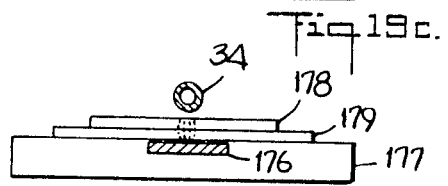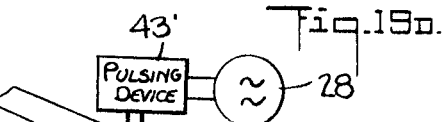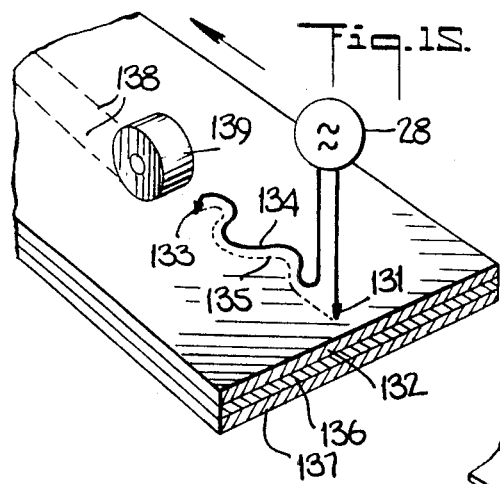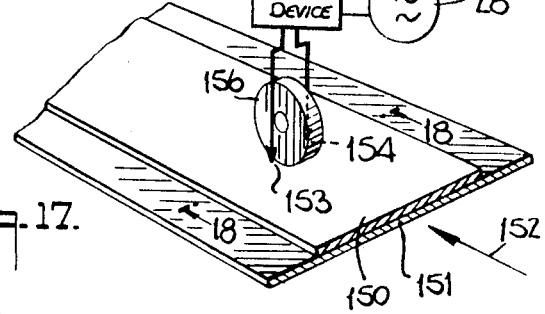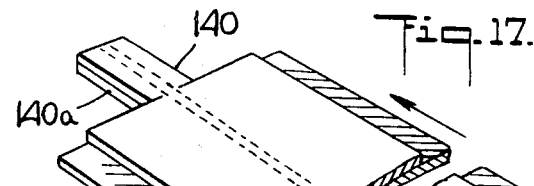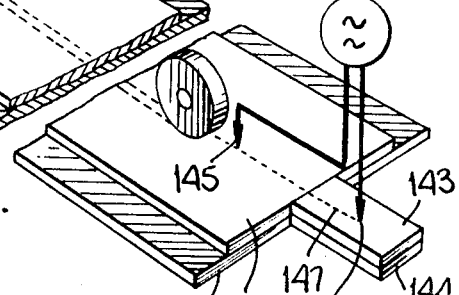
INVENTOR.
WALLACE C. RUDD

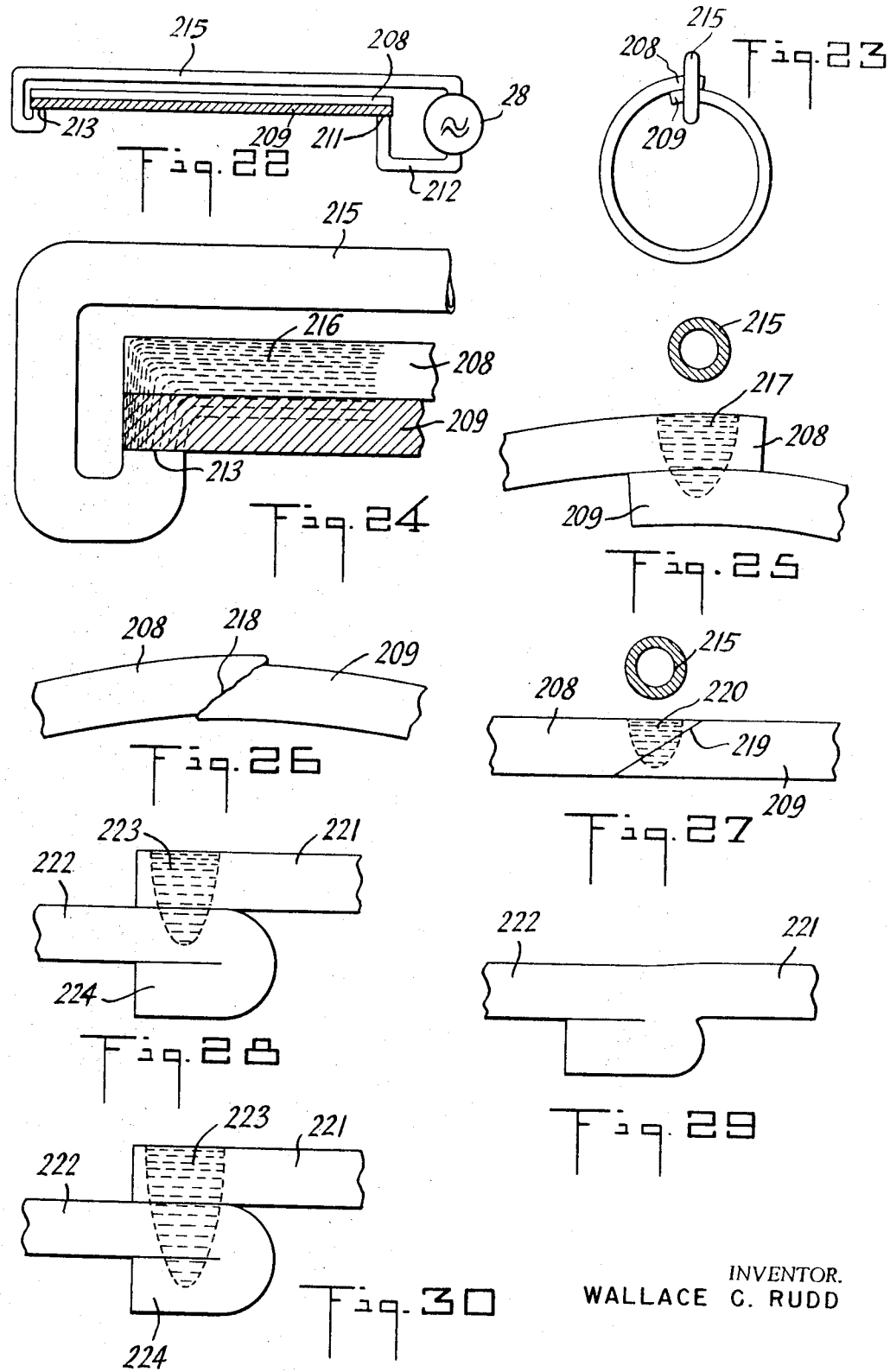

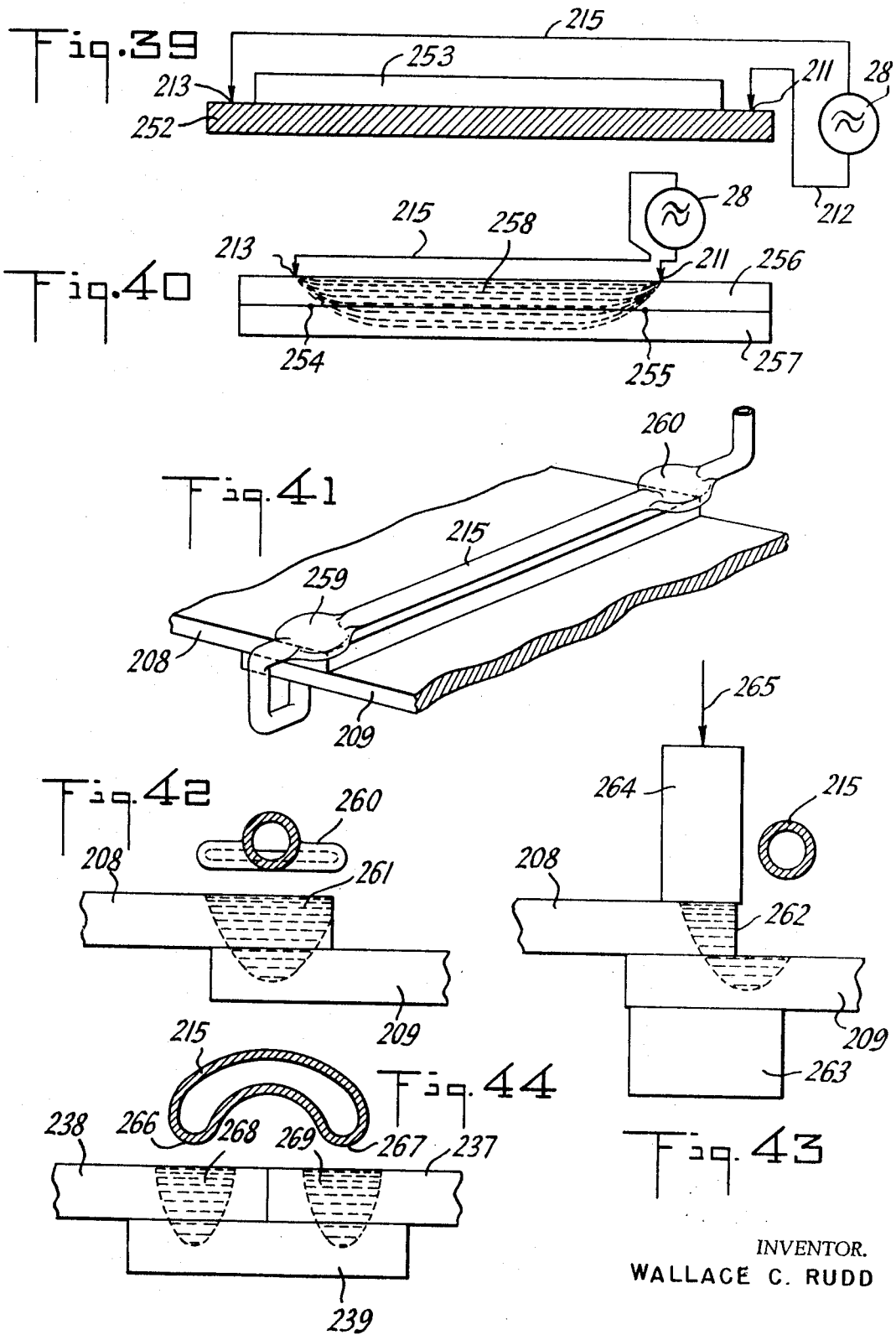

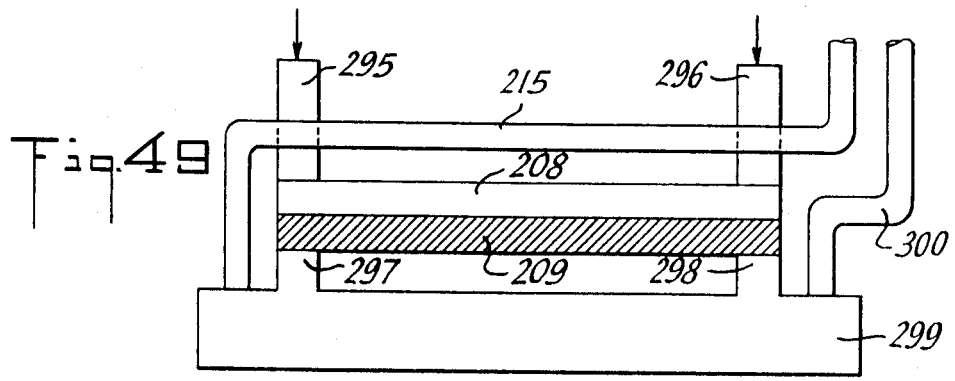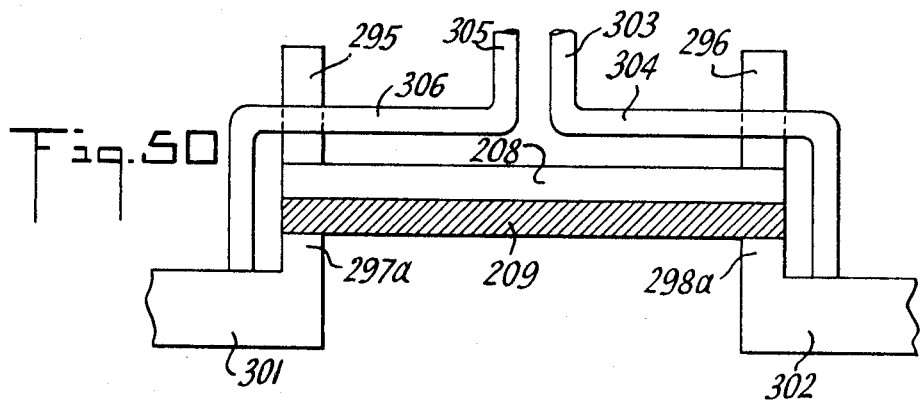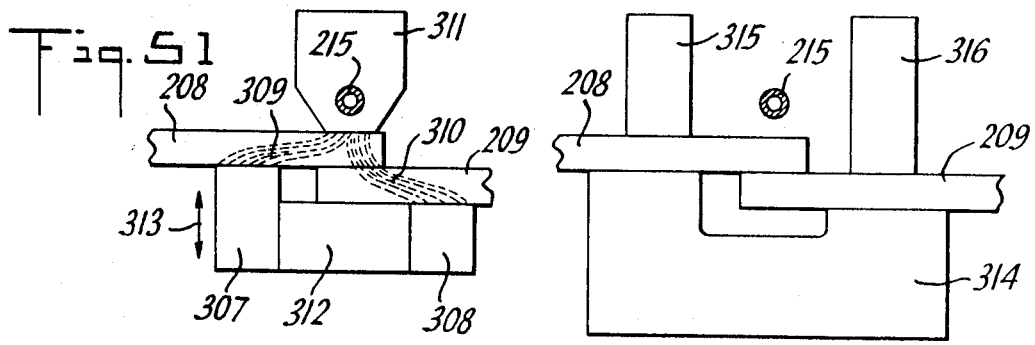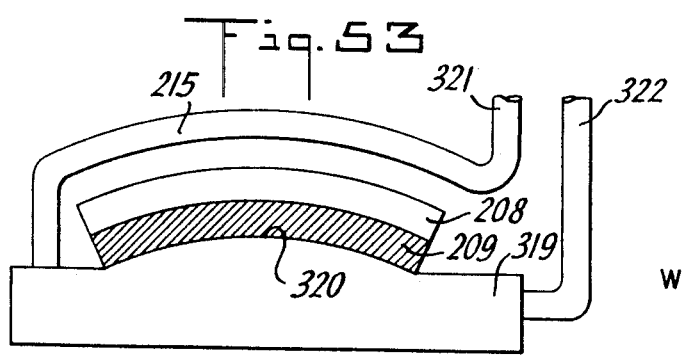

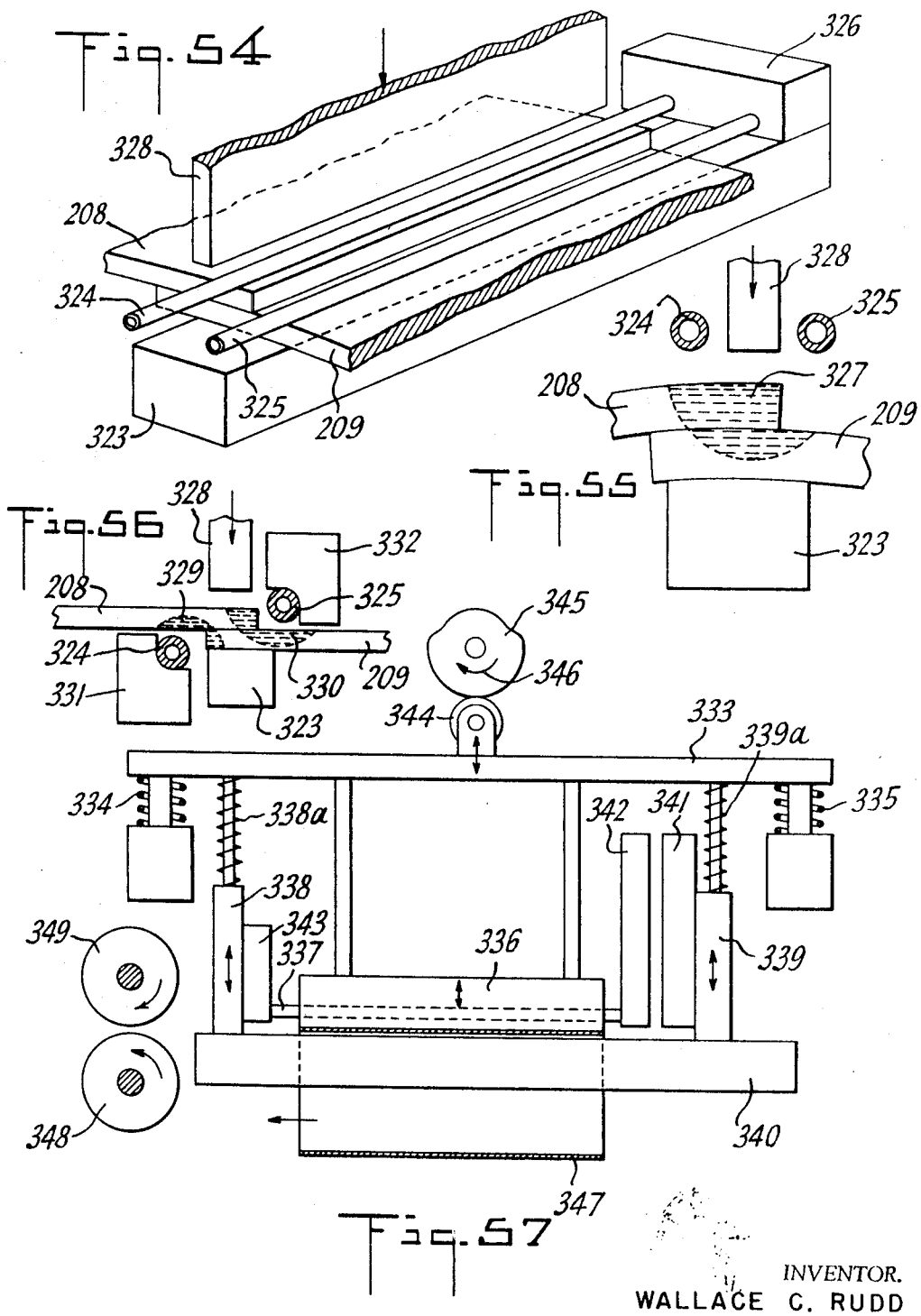

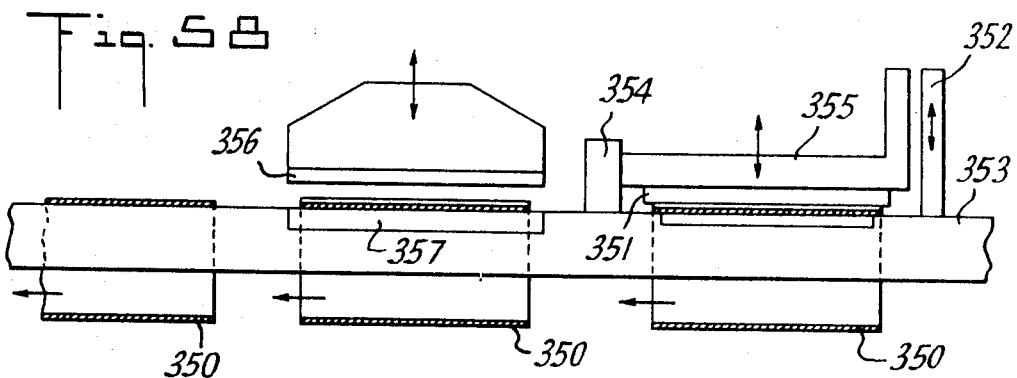
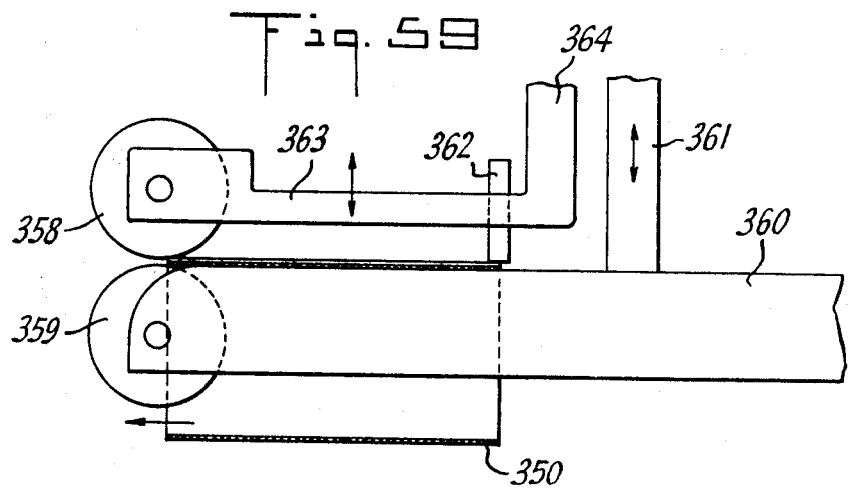
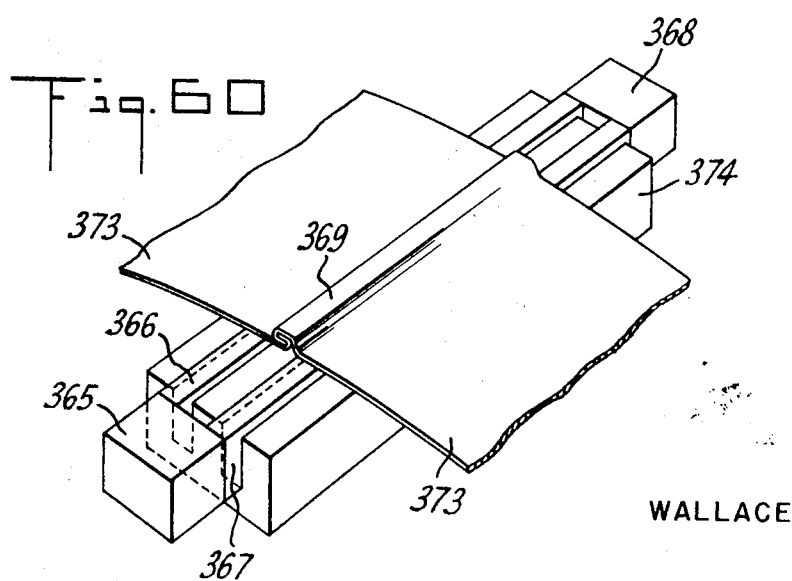

INVENTOR.
WALLACE C. RUDD

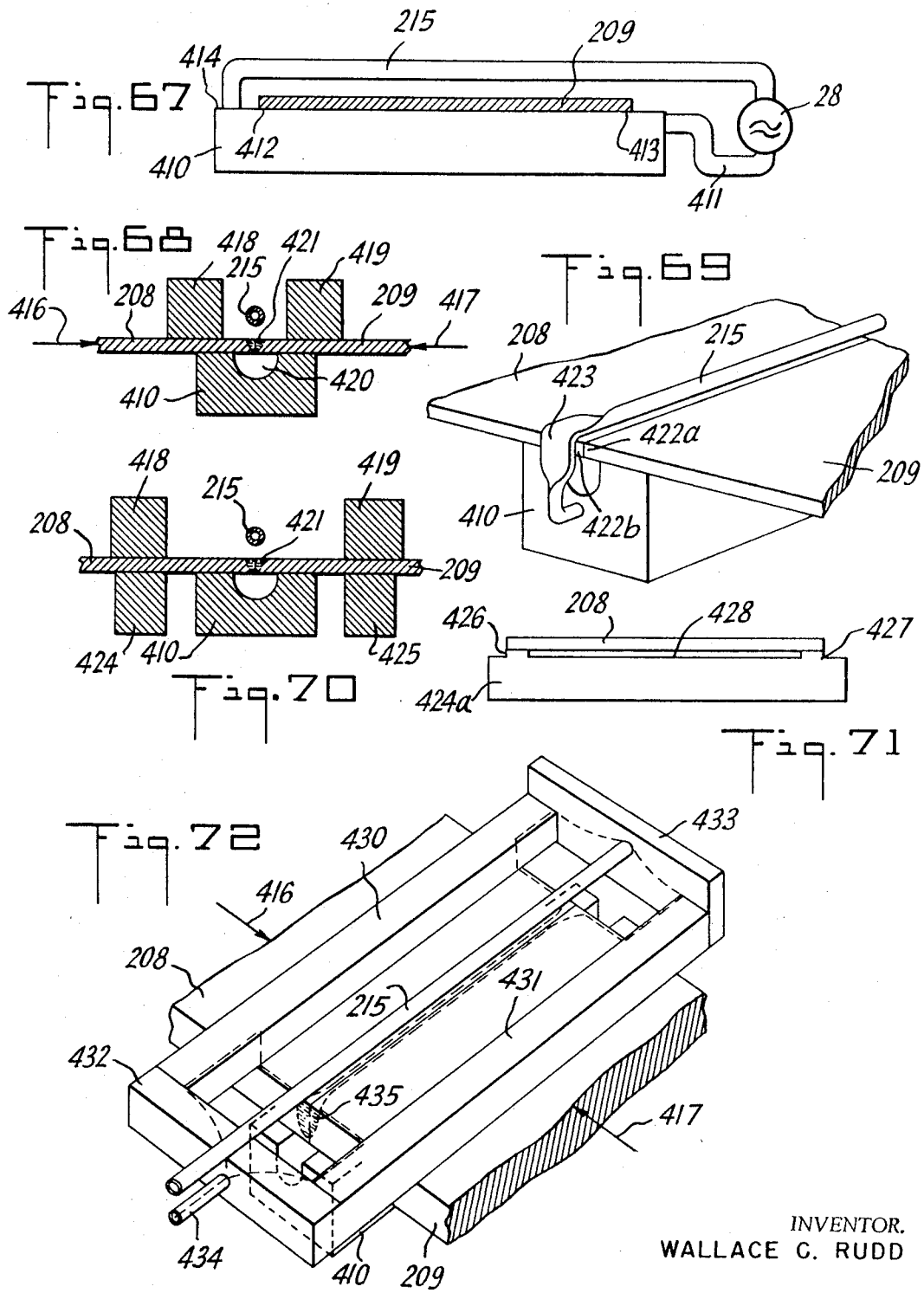

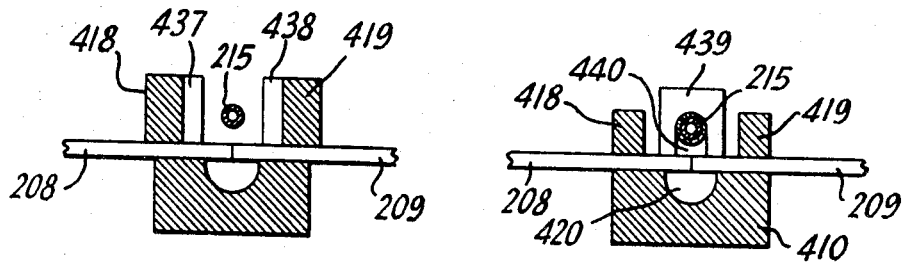
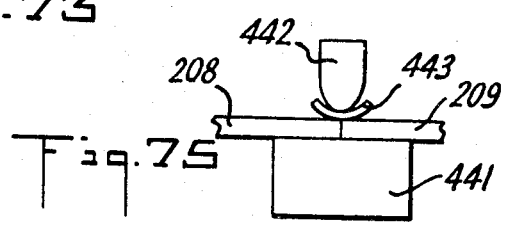
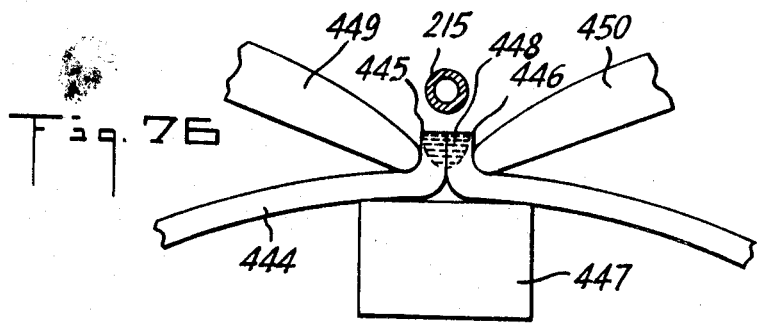
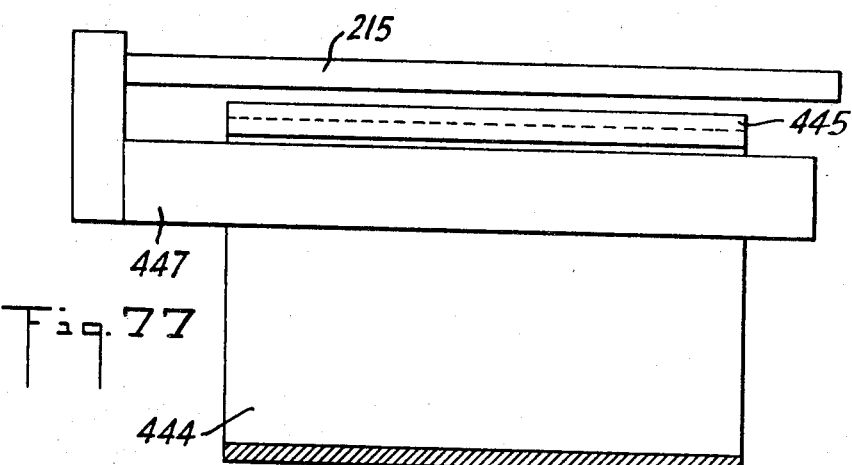
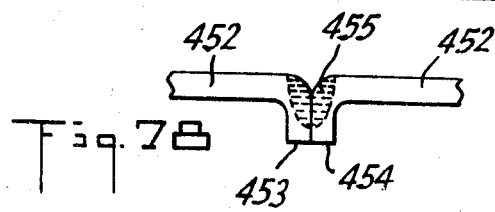
INVENTOR.
WALLACE C. RUDD

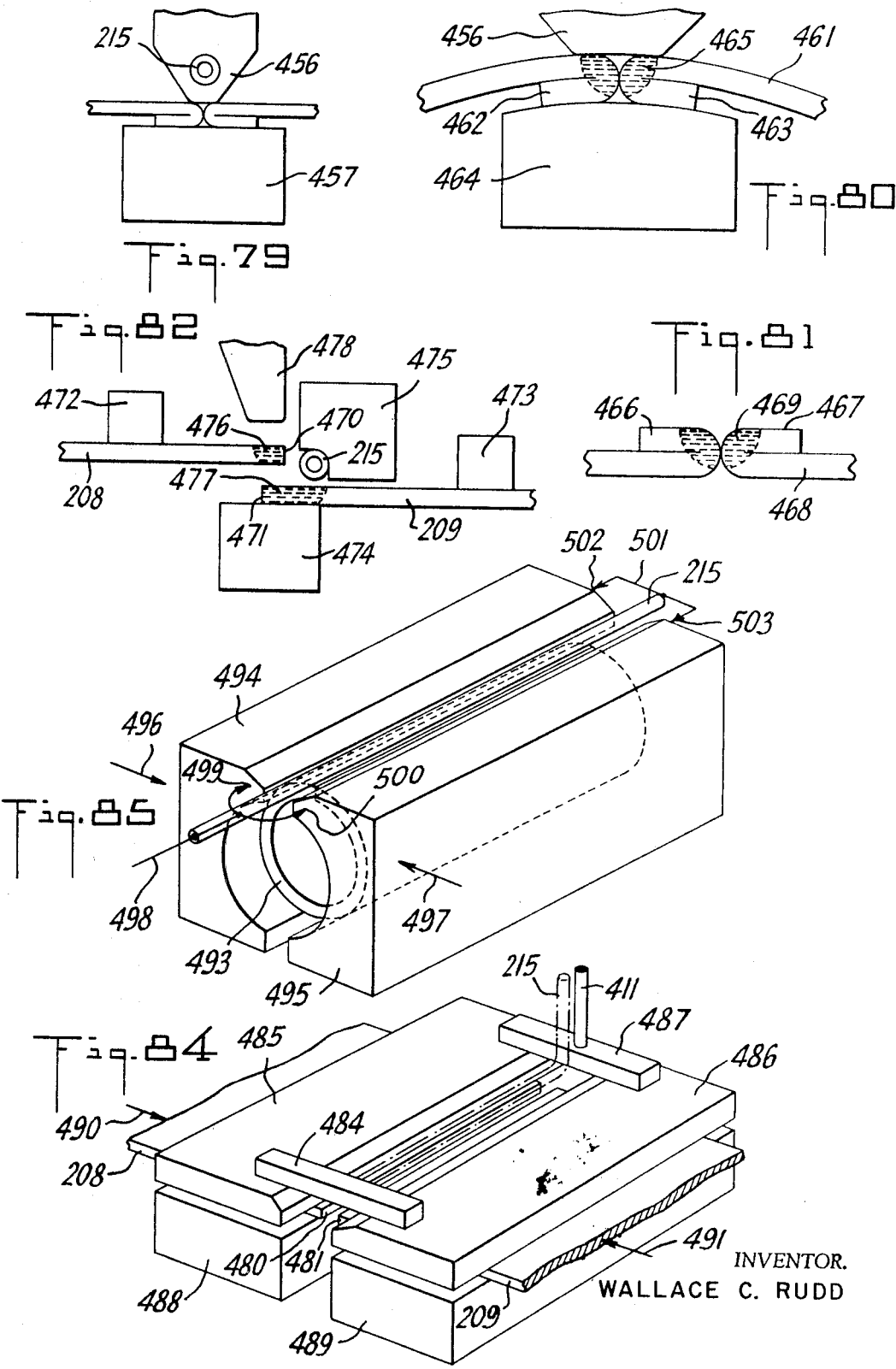

WELDING BY HIGH FREQUENCY CURRENT PENETRATION

This application is a continuation-in-part of my copending applications Ser. No. 510,502 filed Nov. 30, 1965, Ser. No. 792,304 filed Jan. 21, 1969, and Ser. No. 792,644 filed Jan. 21, 1969, the latter two being continuations-in-part of the first one said applications now being abandoned.

This invention relates to welding by the use of high frequency current.

The use of high frequency current for welding purposes by various methods has come into extensive use, particularly in cases where it is desired to take advantage of the so-called "skin effect," for example, in welding a longitudinal seam in rapidly advancing tubing, where such current is applied to the opposite sides of a V-shaped gap in the tubing shortly in advance of the weld point. In such cases, the current flowing at one instant in opposite directions on opposite sides of the gap is caused to be very closely concentrated on the approaching metal surfaces which are the only portions which need to be heated to welding temperature.

However, it has not heretofore been appreciated that certain other types of welding could be possible or feasible, or that the use of high frequency current therefor would lend any advantages. For example, when one sheet of metal is superposed in contact with and over another, it is often desired to weld the two sheets together as by spot welds, or lines of welding, between the contacting surfaces which are covered or concealed and not directly accessible. In such cases it is customary to utilize direct current or ordinary low frequency alternating current applied respectively by contacts engaging the upper surface of the upper member and the undersurface of the other member, so that the current, in flowing from one contact to the other, must pass through the thickness of both members, and creating a more or less molten mass between the two contacts, and thereby forming a weld. In such cases, the greater part of the resistance to the current (and the consequent heating effect) tends to occur: (i) at the surfaces of the contacts where same engage the workpieces; and (ii) where the surface of one workpiece engages the surface of the other to be welded thereto. This is because, with such direct current (or low frequency alternating current) there tends to be a substantial amount of "contact resistance" at these points, whereas in the body of the metal of the workpieces the resistance and the consequent heating effect is relatively low, particularly if, as in the usual case, such current is free to distribute itself over a considerable volume of the metal, so that the current is not concentrated where needed.

The present invention, as distinguished from methods of using the "skin effect" of high frequency, more particularly concerns welding methods using high frequency current, in which the current is deliberately caused instead to penetrate the metal of the workpieces to a controlled degree, thereby heating the metal to controlled, predetermined, plastic condition, such that, when pressure is applied forcefully to bring the parts together, a forged-type weld will result.

It as been found in accordance with the present invention that, by the use of high frequency current, quite surprisingly efficient, reliable and rapid welding may be accomplished with such types of welding, where, for example the contacting surfaces of two superposed sheets, plates or other metal portions, are to be welded together, the method of the invention making it possible to achieve good forged-type welds along well-defined lines or regions between the members (viz at regions concealed between the members) by application of the high frequency current only to an exposed surface of one of the members.

More specifically, in accordance with one embodiment of the invention, a surface of a first metal member may be welded with respect to a surface which contacts therewith on another metal member, by causing current to flow along the direction of a predetermined desired line of welding, from one point to another point on the exposed surface of the first member, which is opposite from said contacting surfaces and in such manner that the high frequency current penetrates to a reference depth (as hereinafter defined and explained) extending through the first member, through said contacting surfaces and at least partially through the second member, the current being of sufficient strength and duration to heat the metal of the members to a plastic condition to a depth at least through the desired line of welding, after which the members are pressed together forcefully, to form a forged-type weld therebetween of such plastic metal along the desired weld line.

According to another embodiment of the invention the two metal members to be welded together are in butting contact along adjacent edges and the high frequency current of the proper frequency is caused to flow in the same direction along the two butting edges to be welded. The current also is caused to flow in the opposite direction in a proximity conductor or conductors located in fixed close proximity to, but to one side of the butting edges to be joined.

Since the proximity conductor is disposed to one side of the edges to be joined, the current will tend to concentrate at such side of the edges. Accordingly, the edges will tend to heat faster at such side, and if the frequency of the current is relatively high, the faster heating side may overheat or become undesirably soft before the remainder of the edge portions become heated to the desired temperature even though the heat tends to spread by conduction throughout the edge portions. Also, if the edges to be welded together are in contact during heating, the depth of penetration of the current in the thickness direction depends on the frequency of the current. Therefore, while it is desirable to use a relatively high frequency to confine the current flow in the metal portions as much as possible to the areas where heating is desired, nevertheless, the frequency should be such that the desired heating is rapidly produced entirely through the areas to be joined without unnecessary or undesired heating of the portions nearest the proximity conductor or conductors. Accordingly, the frequency preferably is selected so as to provide a reference depth for the metal between 0.5 and 4 times the narrow dimension of the face of the edges and hence, the thickness of the metal members if they are of the same thickness. Of course, if the members are of different thickness, or are not in contact during heating, other considerations may apply as will be explained hereinafter. Frequencies at least as high as 3,000 Hz. ordinarily will be used and preferably are in the range from 10,000 to 750,000 Hz.

This method of utilizing high frequency current has a number of important advantages, due to facts which have generally been overlooked, or not appreciated in the high frequency art. That is, for example, tests have shown that, when high frequency current passes from a contact (whether a sliding or a roller-type contact) into a workpiece, the contact resistance and consequent heating effects at the immediate location of the contact, are surprisingly small, even though the actual effective areas of the contacts are small and are applied with only light pressure, and even if applied to surfaces covered with scale. Thus the problems of maintenance of the contacts and preventing same from overheating, as well as the avoidance of pressures which would tend to mar the work, are all minimized. Similarly, the resistance where one of the workpieces contacts with and is to be welded to another, is quite low, so that the metal at the immediate region of the welding does not need ordinarily to become molten, but can be heated to a controlled plastic degree, thereby facilitating a forged-type weld when the parts are forcefully pressed together. With such high frequency current, the heating effect can readily be extended to the depth required for the welding, and at the same time, through the use of so-called "proximity conductors" the flow of heating current in the metal can be closely concentrated along the desired weld line, or region, and, depending on the configuration of the desired weld (whether straight, curved, or variously offset, etc.) the path of the heating current may be readily made to assume a corresponding shape. The avoidance of contact resistance difficulties, as above-mentioned, not only makes possible the introduction into the metal of large amounts of power at a rapid rate, permitting exceedingly rapid welding operations many times as fast as with conventional welding, but furthermore, the concentration of the heating current closely along the paths where it is actually utilized, avoids waste of power, while contributing to such high speeds of operation and with avoidance, in most cases, of formation of molten metal, and any consequent permanent deformations of the workpieces.

Various further and more specific objects, features and advantages of the invention will appear from the description given below, taken in connection with the accompanying drawings, illustrating by way of example preferred forms of the invention.

In the drawings:

FIG. 1 is a diagrammatic view showing in perspective one of the preferred arrangements for carrying out the invention to weld overlapping metal pieces which move together along a path;

FIG. 2 is a longitudinal, vertical, sectional view indicating the depth and extent of penetration of the heating current in the members to be welded together;

FIG. 3 is a view similar to FIG. 2 but indicating the regions at which the workpieces are heated to plastic condition;

FIG. 4 is a transverse, vertical, sectional view showing the depth of penetration of the heating current;

FIG. 5 is a schematic perspective view illustrating the manner in which direct or ordinary low frequency alternating current (as per the prior art) tends widely to distribute itself when applied by contacts to a workpiece;

FIG. 6 is a perspective view somewhat similar to FIG. 1, but illustrating certain modifications, and illustrating a typical form of the apparatus in further detail;

FIG. 6A is a transverse, vertical, sectional view taken substantially along line 6A-6A of FIG. 6;

FIGS. 8A is a diagrammatic perspective view of another embodiment, showing the invention as applied to the problem of welding together along longitudinal lines, the inner and outer layers of a multiwall tube;

FIG. 9 is a diagrammatic perspective view of another embodiment of the invention as applied to the problem of welding where one of the members is a corrugated sheet;

FIG. 10 is a diagrammatic perspective view illustrating the manner in which the invention may be used for welding workpieces together which are connected at their edge portions by interlocking seam means;

FIG. 11 is a transverse, vertical, sectional view, taken substantially along line 11-11 of FIG. 10, indicating the resulting weld formation;

FIG. 12 is a schematic perspective view showing the invention as applied to the problem of welding a sheet to an edge of a member upon which said sheet is superposed;

Figure 20:
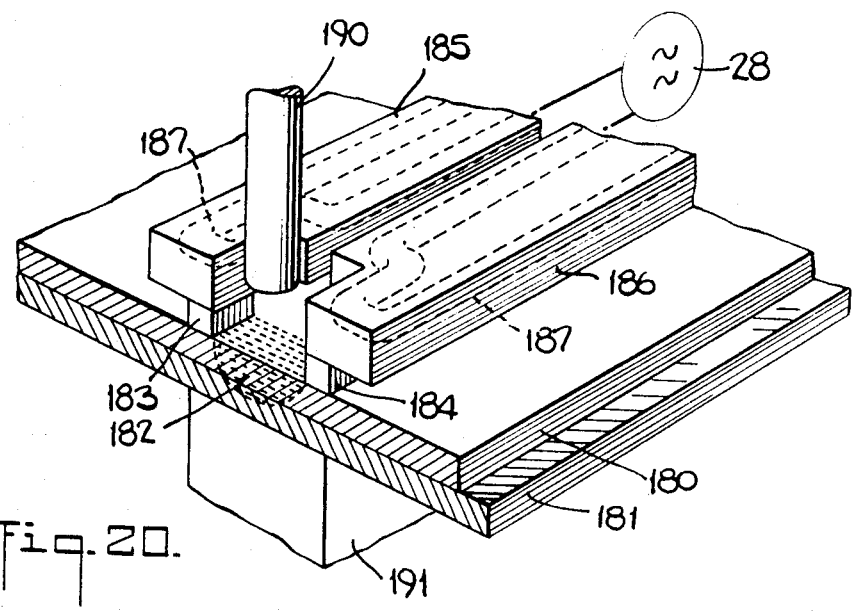
Figure 21:
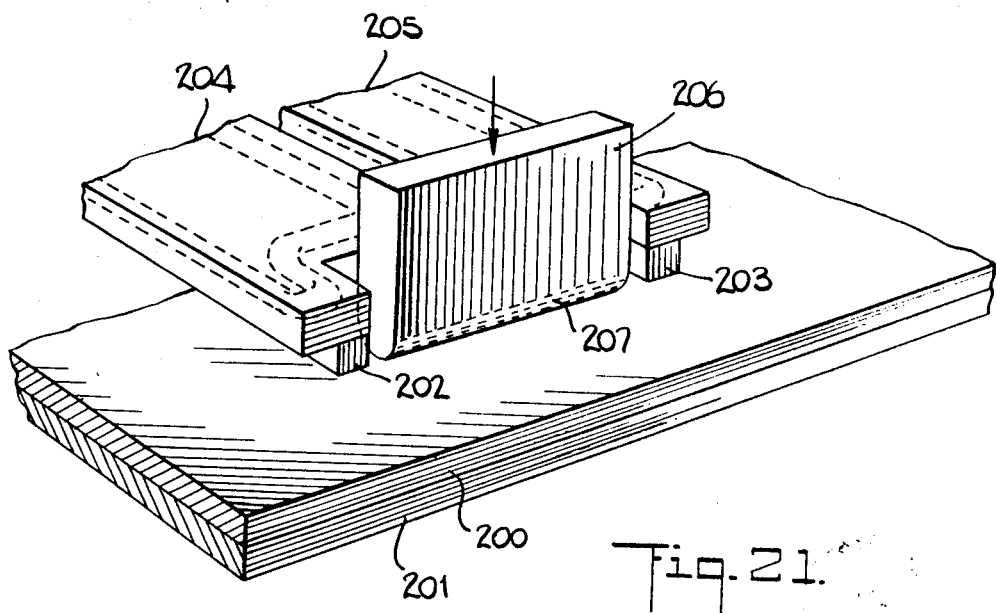
Figure 45:
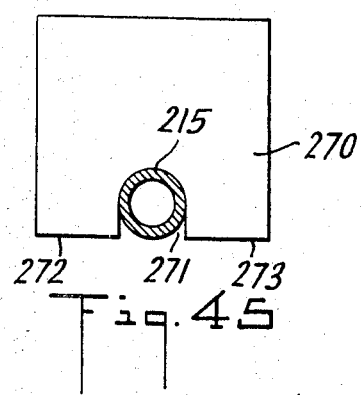
Figure 46:
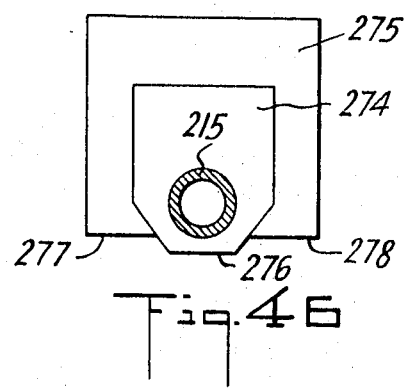
Figure 47:
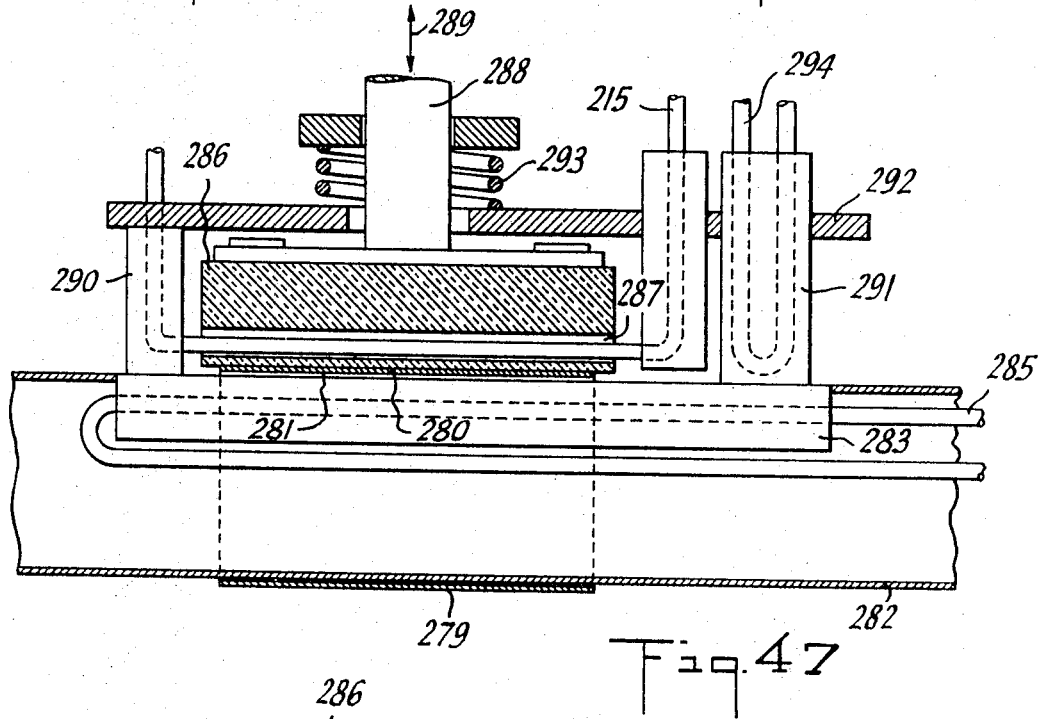
Figure 48:
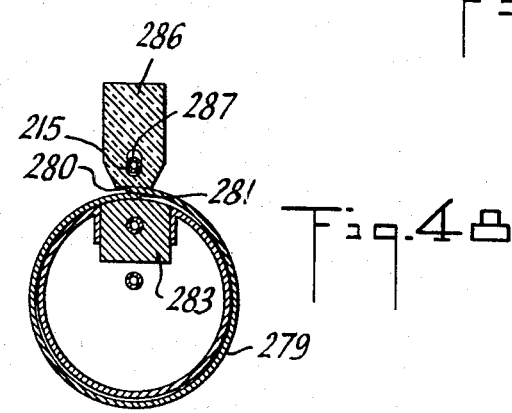
Figure 61:
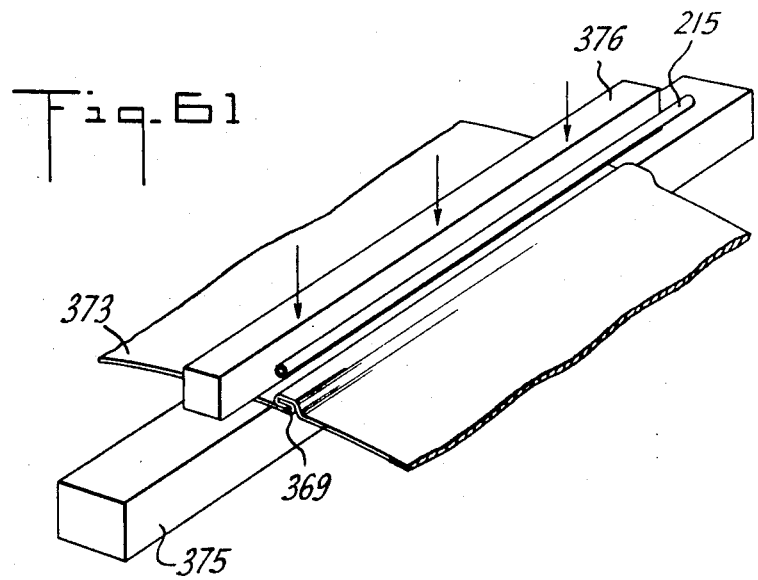
Figure 62:
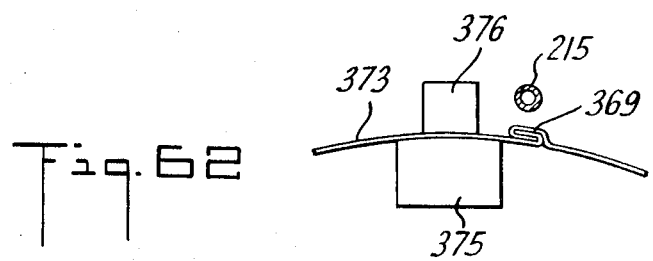
Figure 63:
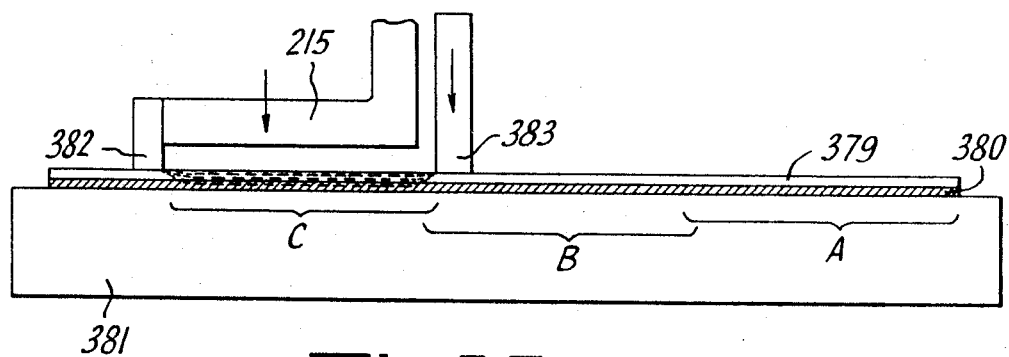
Figure 64:
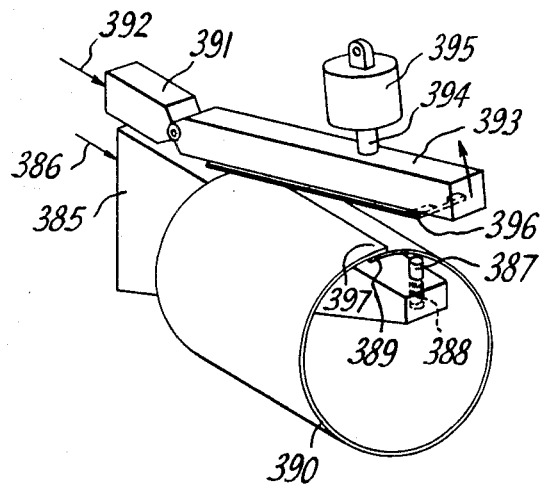
Figure 65:
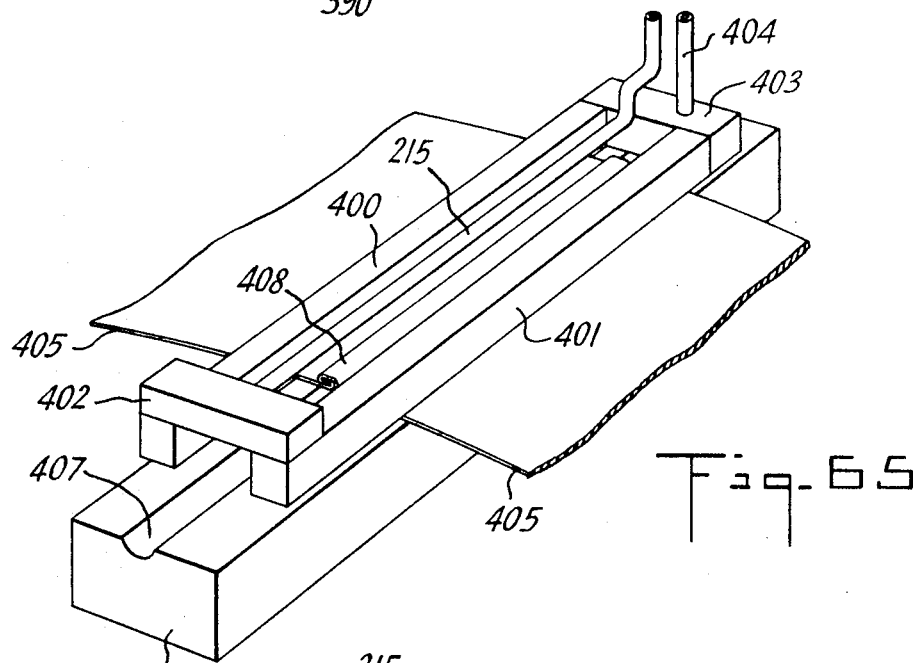
Figure 66:
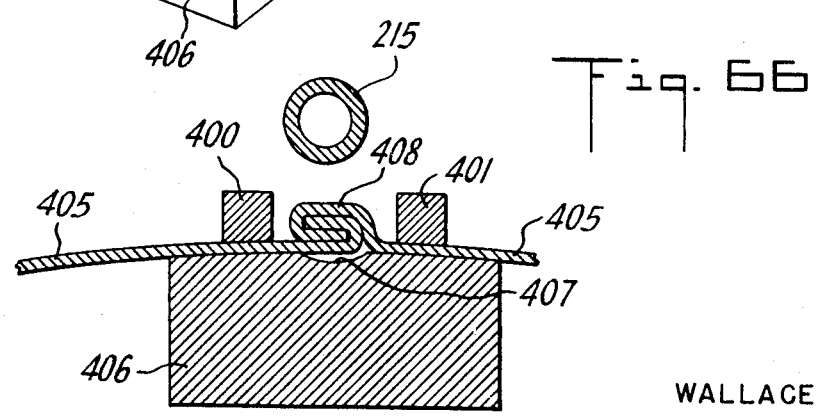
Figure 86:
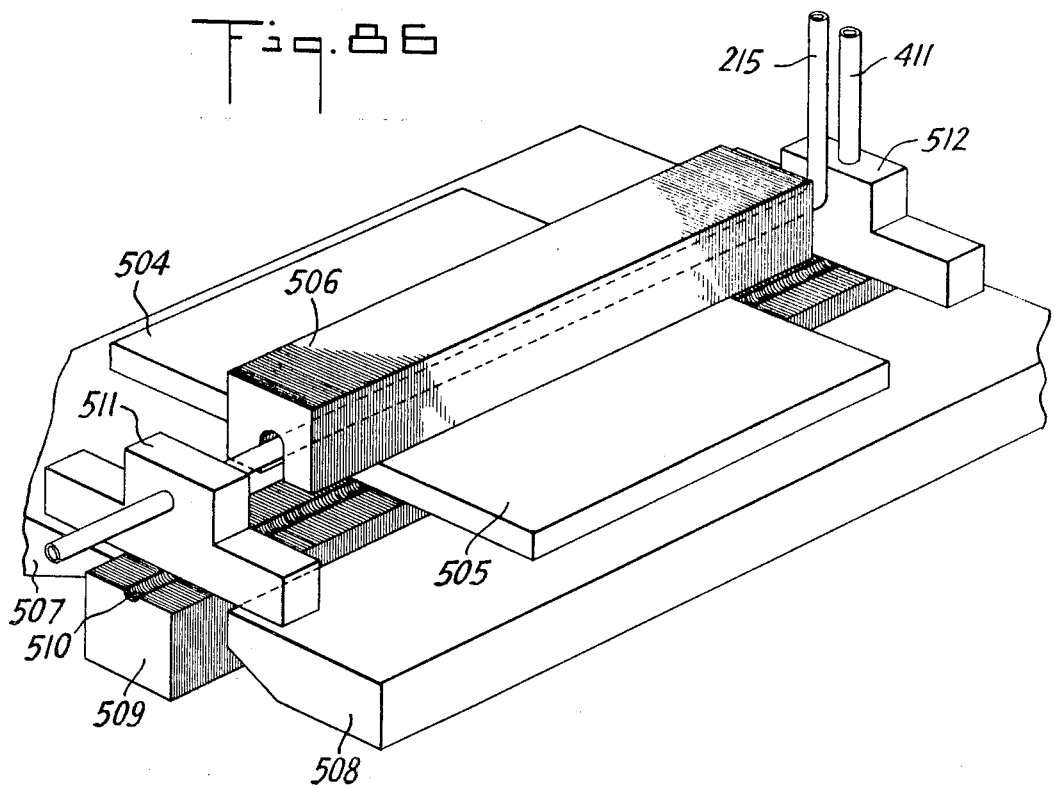
Figure 83:
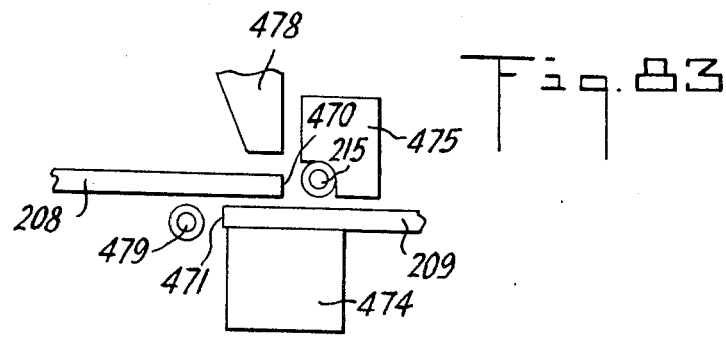

FIG. 13 indicates the resulting weld formations where such a plate or sheet is welded upon edges to two forms of strips upon which the sheet is superposed;

FIG. 14 is a schematic perspective view illustrating the invention as applied to the problem of forming a weld between two members, one of which is of a special shape, as shown;

FIG. 15 is a schematic perspective view showing the invention as applied to the problem of forming a weld extending along a curved line, or, in case the workpieces are moving, the arrangement provides for forming a weld along a band of substantial width;

FIG. 16 illustrates the manner in which the invention may be applied when it is desired to start the weld line at the forward ends of the workpieces, and to continue the weld line to the very trailing ends thereof;

FIG. 17 is a schematic perspective view of an embodiment of the invention adapted for forming lines of welding transverse to the direction of movement of the workpieces, particularly in cases where the work is of relatively thin material;

FIG. 18 is a sectional view, taken substantially along line 18-18 of FIG. 17 and showing the distribution of the high frequency current flowing between the contacts which apply same;

FIGS. 19A to 19D inclusive illustrate various different ways in which the workpieces may be held in proper relation during the welding operation;

FIGS. 20 and 21 are schematic perspective views of further alternative embodiments of the invention;

FIG. 22 is a schematic, side elevation view of an embodiment which illustrates the principles of the invention applied to the welding together of two overlapping metal portions at a fixed position;

FIG. 23 is an end elevation view of the embodiment shown in FIG. 22;

FIG. 24 is a fragmentary, enlarged, side elevation view of a portion of the embodiment shown in FIG. 22;

FIG. 25 is a fragmentary, end elevation view, partly in cross section, of the embodiment shown in FIG. 24;

FIG. 26 is an end elevation view corresponding to FIG. 25 but illustrating the weld produced after forging and working of the metal at the seam;

FIG. 27, is a fragmentary, end elevation view illustrating the application of the invention to the welding together of metal portions having scarfed edges which meet along a line extending diagonally between the major surfaces of the metal portions;

FIGS. 28 through 40 illustrate in simplified form the application of the invention to weld together various other configurations of overlapping members;

FIG. 41 is a perspective view illustrating the welding together of a pair of overlapping metal portions using a modified proximity conductor;

FIG. 42 is a fragmentary, and elevation view, partly in cross section, of the embodiment shown in FIG. 41;

FIG. 43 is an end elevation view, partly in cross section, of a modified embodiment in which the proximity conductor is offset with respect to the edges of the metal portions;

FIG. 44 is an end elevation view, partly in cross section, illustrating the welding of a pair of metal portions to a third metal portion using a modified proximity conductor;

FIG. 45 is an end elevation view, partly in cross section, illustrating a magnetic element associated with a proximity conductor;

FIG. 46 is an end elevation view, partly in cross section, illustrating a combined forge welding bar and proximity conductor with a magnetic element;

FIG. 47 is a side elevation view, partly in cross section, of a preferred embodiment of the invention for making short tubes such as cylindrical can bodies;

FIG. 48 is an end elevational, cross-sectional view of a portion of the apparatus shown in FIG. 47;

FIG. 49 is a side elevation view, partly in cross section, illustrating a modified embodiment for supplying current to the metal portions;

FIG. 50 is a side elevation view, partly in cross section, illustrating a modified form of the embodiment shown in FIG. 49;

FIG. 51 is an end elevation view showing the welding together of metal portions using a combined forging bar and proximity conductor;

FIG. 52 is an end elevation view, partly in cross section, showing a modified form of apparatus for welding together overlapping metal portions;

FIG. 53 is a side elevation view, partly in cross section, illustrating the application of the invention to the welding of curved metal portions;

FIG. 54 is a perspective view illustrating a modified embodiment of the apparatus employing a pair of proximity conductors;

FIG. 55 is an end elevation view, partly in cross section, of a portion of the apparatus shown in FIG. 54;

FIG. 56 is an end elevation view, partly in cross section, illustrating a modified embodiment of the apparatus shown in FIGS. 54 and 55;

FIG. 57 is a side elevation view of a modified embodiment of the invention which permits movement of the parts to be welded through the welding apparatus in stepwise fashion;

FIG. 58 is a side elevation view illustrating apparatus for forging the part together in a position separate from the position in which they are heated;

FIG. 59 is a side elevation view illustrating a modified form of apparatus for forging the parts together by means of rollers;

FIG. 60 is a perspective view of a further embodiment of the invention;

FIGS. 61 and 62 are views of another modified embodiment of the invention;

FIG. 63 is a side elevation view illustrating the application of the invention for producing a series of line welds between a pair of relatively long metal portions;

FIG. 64 is a perspective view of an embodiment of the invention particularly useful in seam welding of large tubes such as metal drums;

FIGS. 65 and 66 are views of a further embodiment of the invention;

FIG. 67 is a schematic side elevation view, with clamping bars omitted, of an embodiment of the invention for butt welding the adjacent edges of two fixed members;

FIG. 68 is a cross-sectional, end elevation view of the embodiment shown in FIG. 67 and with the clamping bars in place;

FIG. 69 is a fragmentary, perspective view of a modified form of the embodiment shown in FIGS. 67 and 68 and illustrates a modified proximity conductor;

FIG. 70 is a cross-sectional, end elevation view of a modified form of the embodiment shown in FIGS. 67—69;

FIG. 71 is a fragmentary, side elevation view illustrating a modified form of the conductor supplying current to a metal portion;

FIG. 72 is a perspective view illustrating one preferred form of the apparatus of the invention;

FIG. 73 is a cross-sectional, end elevation view of a modified form of the apparatus shown in FIGS. 67 and 68;

FIG. 74 is an end elevation view of another modified form of the apparatus shown in FIGS. 67 and 68;

FIG. 75 is a fragmentary, end elevation view illustrating an alternative manner in which the metal portions may be forged together;

FIGS. 76 and 77 are simplified views of apparatus for welding together metal portions having an upturned lip;

FIG. 78 is a fragmentary, end elevation view illustrating the use of the invention with metal portions having a down-turned lip;

FIGS. 79 and 80 are end elevation views illustrating the use of the invention in connection with metal portions having inwardly folded lips;

FIG. 81 is an end elevation view illustrating the application of the invention to the welding of metal portions having outwardly folded lips;

FIGS. 82 and 83 are simplified views of respective apparatus for welding together metal portions the edges of which are disposed one above the other;

FIG. 84 illustrates one preferred form of apparatus for butt welding together the ends of metal strips;

FIG. 85 is a perspective view of one form of apparatus for butt welding the edges of tubing; and FIG. 86 illustrates in perspective another preferred form of apparatus for butt welding together the ends of metal strips.

Referring now more particularly to FIG. 1, there is here sown a first metal portion 25, superposed over a second metal portion 26, both of these members here being shown in the form of platelike members or sheets, although it will be understood that the invention is not necessarily limited to the welding of members of plate or sheetlike forms. The arrangement here shown is adapted to cause welding of the undersurface of the member 25 to the upper surface of the member 26, which is held by suitable means (not § hown) in contact therewith, the welding occurring along a line beneath the dotted lines indicated at 27. Current from a suitable high frequency source 28 is applied in this instance to suitable spaced-apart contacts 29—30, so that there will be a path of current flow therebetween along the dotted line indicated at 31. While the contacts (as here shown) may be of a suitable construction and types heretofore known for use in high frequency welding apparatus, and arranged slidably to engage the work, same may, if preferred, be in the form of rollers, as explained hereinafter in connection with FIG. 6, for example. The electrical connections 32, 33 for conducting the current to the contacts, are preferably arranged so that one or both (connection 33 in the form here shown) has a portion, as at 34, extending along in close proximity to the desired path of heating current 31. Since at any instant the current will be flowing in the portion 34 in a direction opposite so that flowing along path 31, the effect of the close proximity conductor 34 will be that of causing the current in path 31 to be very closely confined to that path. While usually, if the contacts are spaced some distance apart, as here shown, it will be desirable to have a proximity conductor portion as at 34 to extend horizontally along closely above the current path 31, yet in some cases where the contacts may be much closer together, the lead connections may extend directly down to the contacts, and it will be found that such lead connections still afford a substantial degree of the proximity effect, causing the close concentration of the current flow along a narrow path on the workpiece.

It will be understood that, as in the usual case of high frequency connections, same should be suitably fluid-cooled, as should also the contacts, or at least the supporting parts therefor, although here in FIG. 1, for simplicity, the connections are shown simply as heavy lines. As shown in FIG. 2, the current in flowing from contact 29 to contact 30 may be caused to flow in the metal parts down to a predetermined reference depth, as hereinafter explained; and the current would ordinarily be caused to flow in the regions indicated by horizontal dash lines 35 in FIG. 2.

Assuming now that the workpieces are being rapidly advanced in the direction of the arrows indicated in FIGS. 1, 2 and 3, the current will cause heating of the metal to substantially a controlled plastic condition over the regions indicated by the horizontal dash lines 36 in FIG. 3. Viewing the same region transversely in vertical section as in FIG. 4, the metal will be heated to such plastic condition over a region, such as indicated at 37. Then, as the workpieces are advanced, same may be passed through suitable pressure-applying means for forcing one firmly against the other, and these (as shown in FIG. 1) may take the form of upper and lower pressure rollers 40 and 41, which thereupon cause a good forged-type weld to be formed between the contacting surfaces of the workpieces. Due to the concentration of the current by reason of the presence of the proximity conductor 34, there will be a high power density, in kilowatts per square inch, in the regions indicated at 35 in FIG. 2; and, furthermore, heating of the surface of the lower member 26 will be increased by reason of thermal conduction from the upper member.

As contrasted with the distribution of the high frequency current, as in FIG. 2, it may be noted that, if direct current or ordinary low frequency alternating current were used instead, then, in passing between contacts, as at 29' and 30' (as shown in FIG. 5), such current would distribute itself over a wide area, as indicated at 42, and such current, in the depths of the metal, would follow closely the paths of least ohmic resistance and thus, in the usual case, the major potion thereof would tend to heat the upper workpiece 25', even to molten condition, possibly before enough of the current passed through the contacting surfaces into the lower member 26' to heat the latter to any welding temperature.

As indicated in FIG. 1, if desired, the high frequency source 28 may be connected through a suitable pulsing device 43, or, if desired, an arrangement associated with, or forming a part of the high frequency generator, so as to supply the current as a succession of pulses, thereby causing the welds to be formed as a succession of short lines, or even a succession of spots, depending upon the speed of advance of the work as compared with the rapidity of heating. This pulsing, for example, may be accomplished by applying a negative blocking potential to the grid of the oscillator (in case an oscillator is sued as the high frequency source) by the use of an intermittently operated switch, the operation of which may be indexed, if desired, with the movement of the workpieces. An arrangement of this kind is disclosed in applicant's copending U.S. application Ser. No. 365,835, filed May 7, 1964, now Pat. No. 3,327,088, issued June 20, 1967.

It will be understood that the workpieces are advanced in contact, as shown in FIG. 1, by any suitable means, such as feed rollers (not shown) or otherwise. Also, any suitable means may be used for retaining the workpieces in engagement or in contact, several examples of such means being described hereinafter in connection with FIGS. 19A to 19D inclusive. It will be further understood that, in some cases if preferred, the assembly comprising the contacts and their connections may be advanced relative to the workpieces, while the latter remain stationary. In still other instances (as hereinafter explained), this arrangement of high frequency contacts and connections, as well as the workpieces, may retain static, while other means, such as referred to hereinafter in connection with FIGS. 20 and 21, may be used forcibly to press the parts into forged-welded relation after heating same to plastic condition along beneath the current path 31.

The manner in which the high frequency flow may be controlled to the desired referency depth (or depth of penetration) will now be explained in further detail.

It is conventional to define the depth of penetration of high frequency current in a conductor, or the so-called "reference depth" as follows;

$$d = 3160\sqrt{\frac{r}{pf}}$$

where,
 $d$ is the reference depth in inches;
 $r$ is the resistivity of the metal in ohm-inches;
 $p$ is the relative permeability of the conductor; and
 $f$ is the frequency of the current in cycles per second.

As will we noted from the above equation, the higher the resistivity of the conductor, the deeper the current will flow therein; and the more magnetic the material, the shallower the current flow; and also, the higher the frequency, the shallower the current flow. The significance of the so-called "reference depth," according to widely accepted terminology in the art, is that it represents a depth in inches within which approximately 86 percent of the total current is flowing in the conductor.

Such reference depth will, of course, be different for conductors of different materials, having different resistivities; and also different when the temperature of the material widely differs, for example, as a consequence of the material having a higher resistivity at higher temperatures.

Using the foregoing formula, typical examples of the reference depth in inches for various different conductors, at different temperatures and frequencies, are shown in the following table;

From this table, it can be seen, for example, that operating with 450 kilocycles in nonmagnetic stainless steel at room temperature, the depth of penetration of the current is 0.0250 inch. This means that about 86 percent of the total current flowing in the stainless steel sheet will be within 0.0250 inch of the top surface. In such a case obviously the current as a whole would be flowing through the total thickness of the sheet, although the current distribution would be somewhat more dense near the upper surface to which the contacts were applied, than at the bottom surface; but in any event, the total thickness of the sheet would be heated. Now, if, instead of using a single sheet of such stainless steel, for example two sheets were superposed one upon the other in contact, with each of a thickness of 0.012 inch, then the current as a whole would be flowing through the total thickness of the two sheets, viz through 0.024 inch. Tests have shown that this proves to be the case, where one sheet rests upon the other even though the two sheets are not necessarily completely in intimate contact. That is, even though the parting line would, with direct current (or ordinary low frequency alternating current) cause a region of contact resistance to be interposed between the two sheets (thus preventing ready flow of such current into the lower sheet) no such difficulty occurs with the high frequency currents contemplated by this invention.

With the present invention, the current frequency used may vary from a lower range (somewhere between 3,000 and 10,000 cycle s per second) to an upper range as high, for example, as a million cycles per second. High frequency generators for the purpose, having a frequency of 300,000 to 450,000 cycles, are commonly available, although frequencies of 50,000 to 100,000 cycles are quite feasible when generators of those frequencies are economically available.

It will be understood that members can be welded together, in accordance with the invention, which are formed of different metals, and which have different welding temperatures, and which may be of various different thicknesses. In doing so, it will usually be preferable to comply with the following procedures:

i. Place the thinnest member in engagement with the contacts. Current will then penetrate to the member thereunder more readily.

ii. Place the highest resistance member in engagement with the contacts. The current will penetrate this member more readily in depth, and thus more readily to the under member.

TABLE

| Material | Temp., °F. | $r$, ohm-inches $\times 10^{-6}$ | $p$, rel. | Freq., kc. | $d$, inches |
|---|---|---|---|---|---|
| Copper | 68 | .68 | 1.0 | 450 | .0040 |
|  | 68 | .68 | 1.0 | 10 | .0260 |
|  | 1,800 | 3.70 | 1.0 | 450 | .0090 |
|  | 1,800 | 3.70 | 1.0 | 10 | .0610 |
| Brass (70% Cu; 30% Zn) | 68 | 2.47 | 1.0 | 450 | .0074 |
|  | 68 | 2.47 | 1.0 | 10 | .0500 |
|  | 1,000 | 4.50 | 1.0 | 450 | .0100 |
|  | 1,000 | 4.50 | 1.0 | 10 | .0670 |
| Aluminum | 68 | 1.12 | 1.0 | 450 | .0050 |
|  | 68 | 1.12 | 1.0 | 10 | .0330 |
|  | 1,000 | 4.10 | 1.0 | 450 | .0095 |
|  | 1,000 | 4.10 | 1.0 | 10 | .0640 |
| Stainless steel (non-magnetic) | 68 | 29.00 | 1.0 | 450 | .0250 |
|  | 68 | 29.00 | 1.0 | 10 | .1700 |
|  | 2,200 | 51.50 | 1.0 | 450 | .0340 |
|  | 2,200 | 51.50 | 1.0 | 10 | .2270 |
| Low carbon steel | 68 | 5.00 | *500.0 | 450 | *.0003 |
|  | 68 | 5.00 | *500.0 | 10 | *.0020 |
|  | 2,200 | 50.00 | 1.0 | 450 | .0330 |
|  | 2,200 | 50.00 | 1.0 | 10 | .2210 |

*In magnetic steel, $d$ depends upon permeability, which in turn depends upon flux density, which in turn is highest at the surface and decays inwardly approximately in the same way as current density.

iii. If one of the members is magnetic, place same under the other member, since penetration of magnetic material is thus easily accomplished, and would tend to restrict penetration of the current if it were the upper member in engagement with the contacts. (However, from he above table, it will be noted that, if a magnetic member, for instance low carbon steel, is heated to above its Curie point, then at a frequency of 450 kc., the reference depth will be many times greater than at room temperature and at 10 kc., even much greater. Thus in some cases it may be advantageous to preheat the magnetic member or members just before same are brought to the welding station.

iv. The relative heating of the two metal members can be controlled by selection of a frequency such that the depth of penetration through the upper member is just sufficient to provide the necessary heat in the lower member.

v. In welding different metals, having different ideal welding temperatures, it may be preferred to place the one on top that requires the higher temperature, and to select a current frequency such as to provide the proper depth of current penetration and heating of the lower member.

It will be understood that, in the usual case, the current need penetrate in the lower member only to a reference depth such that the upper surface thereon will be brought to the desired plastic welding temperature, while leaving the lowermost portions of the under member still rigid, so that same will serve to prevent any displacement or distortion of the parts, as would occur if the metal were softened through the full depth of the members. It may be noted that, while it is desirable to clean the surfaces which are to come into welding contact, yet same need not be perfectly clean or free of scale when frequency current is used.

Further embodiments of the invention will now be discussed. In FIG. 6, the source 28 of high frequency current may be connected through leads which in practice may assume the rigid forms indicated at 45 and 46, having fluid-cooling cavities, the lead 45 carrying a roller contact 47, and the lead 46 carrying a hollow fluid-cooled proximity conductor portion 48, extending along above the desired line of heating indicated by the dotted line 49, and to a fluid-cooled support 50 for another roller contact 51. The latter roller may also act in conjunction with a roller underneath at 52, to apply the necessary welding pressure for forcibly pressing the upper member 53, which is to be welded, down against a lower member 54 along the desired line of welding which occurs beneath the dotted lines indicated at 55. A supporting roller 56, if desired, may be suitably mounted beneath the roller contact 47. With the example shown in FIG. 6, the degree of concentration of the current along the desired path of flow at 49, may, if desired, be increased by mounting (by suitable supporting means, not shown) magnetic elements, as at 57, 58, of a suitable ceramic insulation material which will tend to repel the high frequency current on the surface of member 53, thus causing same to be concentrated closely toward and along the line 49. In some cases it may be inconvenient to place such magnetic members above the member 53, but more convenient to place like members along below the member 54, as shown at 60 and 61 in FIG. 6A.

Figure 7:
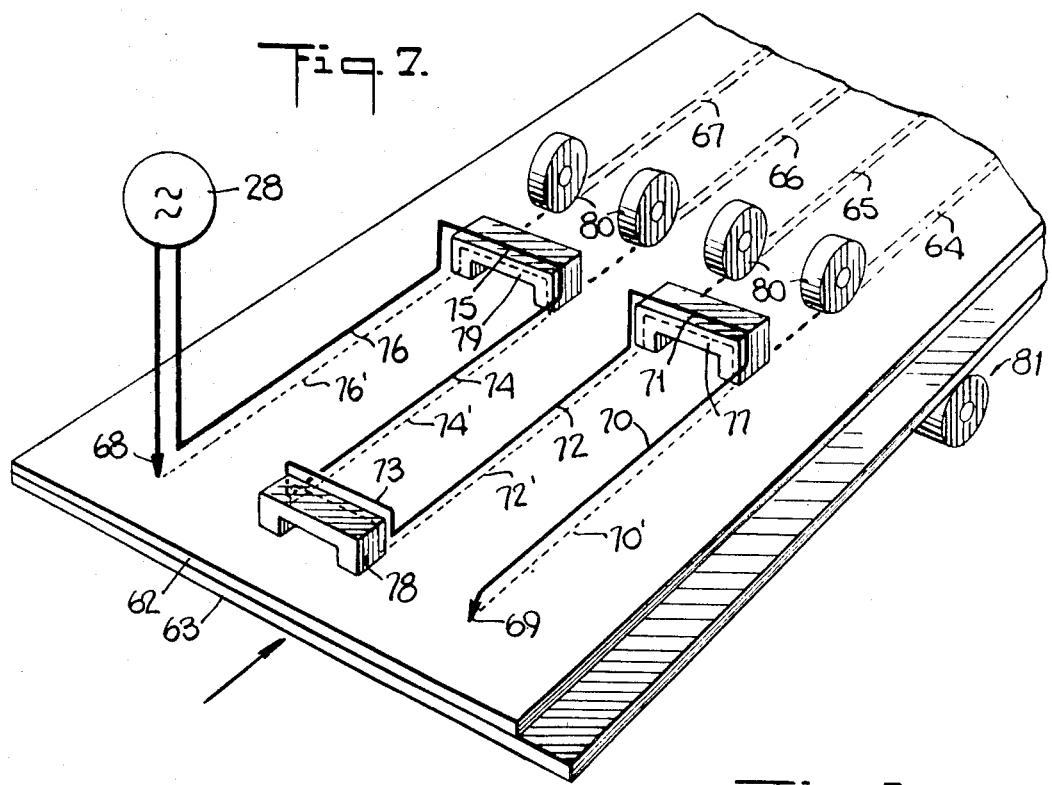
FIGS. 7 and 8 are schematic perspective views illustrating examples of the invention as applied to the problem of concurrently forming a plurality of generally parallel welds between the workpieces.

With the embodiment of FIG. 7, a pair of plates 62, 63 are to be welded together, as they advance in the direction of the arrow shown, along a plurality of bands of welding located beneath the dotted lines indicated at 64, 65, 66 and 67. This may be readily accomplished in accordance with the invention, by connecting the high frequency source to one contact, as at 68, and to another contact as at 69, the latter being connected to the current source through a plurality of proximity conductor portions, as at 70 to 76 inclusive. The portions 70, 72, 74 and 76 are suitably mounted to extend longitudinally along close to, and above, the desired lines of heating which are indicated by the dotted lines correspondingly numbered with prime marks. Then these longitudinally extending conductor portions are all connected in a series circuit, as shown by the transversely extending portions 71, 73 and 75. Since the workpieces are advancing transversely of these latter connections, the current flowing transversely beneath same will not persist along any one line long enough to cause any very substantial heating therealong; but along each of the longitudinally extending lines of current flow, as at 70' to 76', the flows of current, and the resulting heating, will be generally like that of FIG. 1. If desired, in order to minimize the heating of the upper workpiece 62, by reason of the transverse flows of current, bridge elements as at 77, 78, and 79 may be used to carry the current from the end of each longitudinal line, to adjacent the end of the next. That is, in that event, the transverse flows of current will occur along the surfaces of these bridge elements in close proximity to the transverse conductor portions 71, 73, and 75. In most cases, however, such bridge elements may be omitted, as is the case in FIG. 8 described below.

In FIG. 7, a plurality of pressure rollers, as at 80, are provided along above each line of desired welding, and corresponding roller means, as at 81, may be located below the workpieces, so that such rollers will operate in the manner described in reference to rollers 40 and 41 of FIG. 1.

Figure 8:
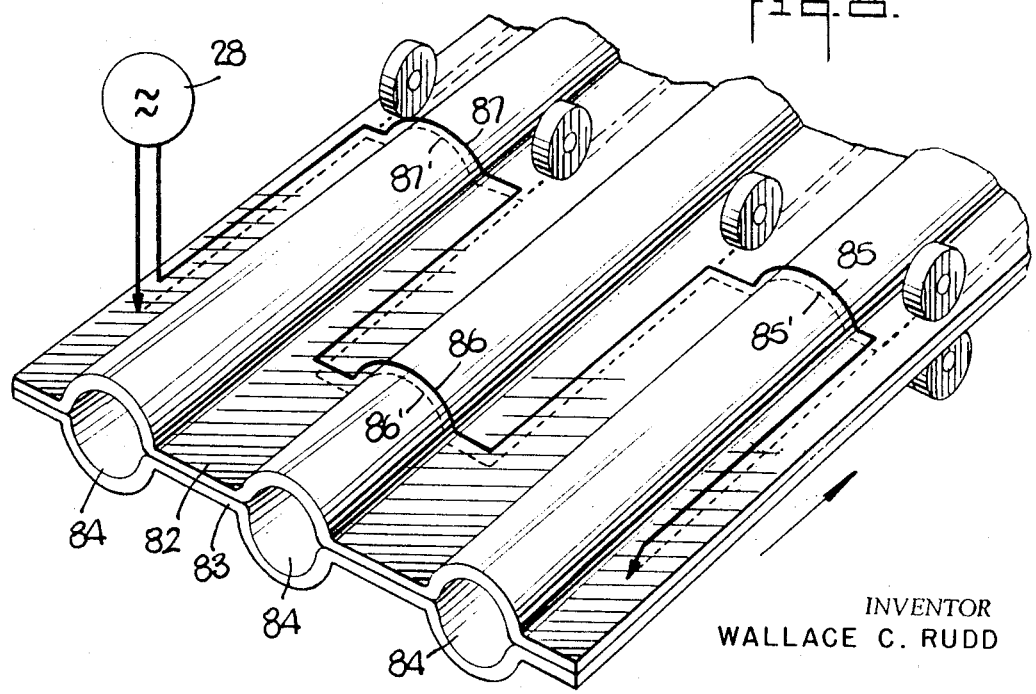

FIG. 8 illustrates the manner in which the invention may be applied to the problem of welding multiwall radiator tube assemblies, for example, comprised of an upper member 82 and a lower member 83, so shaped as to provide pluralities of fluid cavities, as at 84, therebetween. It will be apparent that the circuit and current paths here may be the same as those above described in connection with FIG. 7, except that the abovementioned bridge elements may be omitted, so that transverse proximity conductor portions, as at 85, 86 and 87, may be brought close to transverse current paths, indicated by the same numerals accompanied by prime marks. However, since no one transverse line on the workpieces will have current flowing along same for any substantial time, there will be little heating along such transverse lines.

While in FIGS. 7 and 8, the conductor and current paths are shown for providing for four generally parallel longitudinally extending weld lines, it will be understood that similar arrangements may be used for providing for two, three, or more than four longitudinally extending weld lines, and also, the workpieces may be of various shapes. For example in FIG. 8A, similar connections are shown for providing for two longitudinally extending weld lines, for example for causing welding between inner and outer walls 88 and 89 of a multiwall tube 90, along lines beneath the lines of current flow as shown by dotted lines 91 and 92. As further shown in FIG. 8A, roller means as at 93, 94 may be provided to engage the outer surfaces of the tube along where the desired lines of welding are to occur, viz beneath the dotted lines indicated at 95, 96. Also, if necessary, suitable backup pressure rollers may be mounted on mandrel means inside the tube 90, at the regions of the rollers 93, 94.

With the embodiments shown in FIG. 9, one of the workpieces may, for example, comprise a flat sheet or plate 97, to the underside of which ridges 98 on a corrugated member 99 are to be welded along lines, for example, beneath the dotted lines indicated at 100. It will be understood that two or more longitudinally extending proximity conductor portions, as at 101 and 102, may be positioned to provide a part of the connections for one side of the high frequency circuit from source 28 to a contact 103, the other side of the circuit to contact 104 being provided in the same manner as in FIG. 7. It will be understood that the proximity conductor portions 101, 102 will cause current to be concentrated along paths indicated by the dotted lines at 105, 106, so that current will flow to a reference depth sufficient to heat to plastic condition and to weld two of the ridge portions, as at 98, to the underside of the sheet or plate 97. It will be further understood that beneath the corrugated sheet 99, there may be another plate, as at 107, which has been previously welded in place, by similar means and methods, along its lowermost undulated portions. It will be understood that, in FIG. 9, one might use several longitudinally extending proximity conductor portions (as in FIGS. 7 and 8) for concurrently welding a number of the corrugation ridges in place. Pressure rollers, as at 108, may, of course, be used in the same manner as per the previous figures. The welded assemblies, such as shown in this figure, are adapted for use as so-called "aircraft honeycomb" structures.

With the embodiment shown in FIG. 10, the arrangement of parts, and the functioning thereof, may be the same as in FIG. 1, but here the two workpieces may be in the form of sheet metal parts 109 and 110, which have been previously joined together along their edge portions by folding the same to form interlocking seam configurations at 111, so that, after same go through welding apparatus, a longitudinal weld between two or more of the overlapped layers will be formed, such as indicated at 112 in the cross-sectional view of FIG. 11.

FIG. 12 shows the manner in which similar apparatus may be used, for example, to weld a horizontally extending strip, as at 113, to the upper edge portion 114 of a vertically positioned strip 115, thereby to form a structural member, or the like, of T-shaped cross section.

FIG. 13 illustrates in vertical transverse section two similar embodiments, in one of which a strip 116 has been folded over longitudinally upon itself so as to present along its fold line at 117 an edge portion which has been welded in accordance with the invention to the underside of a platelike member 118. The position of the proximity conductor during the welding is indicated at 34. In the other example shown in FIG. 13, the strip 116' has been folded over as in the case of the strip 116 but its side portions have been somewhat separated with a gap therebetween as at 119 so that in case this is used for radiating purposes, it will have an extended radiating surface. As in the other example of this figure, the upper folded over edge of the double strip is welded to the plate 118 as indicated at 117'. The proximity conductor used during the welding is indicated in section at 34'.

In some cases it may be desired to weld one member to another when one of the members, for example the upper member, may be of a configuration such as would preclude placing the usual high frequency contacts in the proper position to apply the current along the desired weld line if the weld line where to extend straight from one contact to the other. Also, in some cases it may be desired to apply the current to a proposed weld line region along which the metal has been knurled, engraved, "engine turned" or possibly decorated with coatings of plastic or enamel, etc. so that in any such events, if the current were applied by contacts directly slidable thereon, the finish might become scratched, marred, or good contact might not be had. FIG. 14 illustrates a typical way in which these problems may be overcome. Here a lower member as at 120 which is moving longitudinally in the direction of the arrow shown is to be welded to an upper member 121 along a weld line located for example along beneath the dotted line 122. Here the line 122 might be so close to protruding portions such as at 123 on the member 121 that the high frequency current contacts in the usual form could not be brought close enough to apply the current along the line 122. In this case, the current from the high frequency source 28 may be brought through a connection 124 to a contact 125 slidably engaging the member 121 at a point spaced laterally from the obstructing portion 123. The other connection to the high frequency source may be by way of a connection portion 126 extending down close to the contact 125 and then extending laterally over to a proximity conductor portion 127 which extends along above and in closely spaced relation to the line 122, thence to another lateral portion 128 and to the other contact 129. Thus, with this arrangement the current may be caused to be closely concentrated along line 122 and at no time need the contacts bear against the regions along this line and thus if various forms of decorations or obstructions are provided along that line, there will be no danger that same will become engaged, marred or scratched by the contacts and if any decorations or coatings are applied thereto, same will not cause the surfaces therealong to be insulated from the contacts since the contacts will engage only readily accessible areas spaced laterally substantially so far as desired away from the line 122. Pressure rollers, the upper one of which is indicated at 130, may be used to complete the formation of the desired forged weld as in the case of FIG. 1.

Another example of the invention is illustrated in FIG. 15 where the high frequency current is applied to a first contact at 131 engaging the upper member 132, the other terminal of the high frequency current being connected to a contact 133 through a proximity conductor portion as at 134 which may take the form of any desired curve, zigzag or sinuous formation as shown. This will cause the path of the heating current at any one moment to follow along a line such as indicated by the dotted line 135 which is in a sense a mirror image of the proximity conductor portion. Thus if the member 132 and a member or members 136 and 137 therebelow which are to be welded to the member 132 are uniformly advanced in the direction of the arrow, then heating will occur along beneath the line 135 to the desired or required reference depth and over an area or band of some substantial width. This will cause the welding to occur over the width of a band such as indicated by the dotted lines at 138 after passing pressure roller means as at 139. This FIG. 15 illustrates an example where the invention may be applied to welding more than two plates or other members to each other, viz in the instance here shown the plate 132 may be welded along beneath the band 138 to the upper surface of member 136 and the lower surface of the latter will be welded along a similar band to the upper surface of the member 137 assuming that the current is applied in accordance with the foregoing teachings in such manner that the reference depth of the heating current will extend down at least part way into the third member 137.

In some cases, it may be desired to start the line of welding at the very forward ends of the workpieces and to continue such welding to the very trailing ends or edges thereof. FIG. 16 illustrates how this may be accomplished so that the current and the resulting heating will start soon enough to accomplish this purpose and to persist to weld to the trailing ends of the workpieces. That is, as here shown, the forward end edges may have suitably applied thereto as by tack welding or suitable clamping means, not shown, a forwardly protruding lug as at 140 at the level of the upper workpiece 141 and if desired also another lug 140a at the level of the lower workpiece 142. Similarly at the trailing ends of the workpieces one or two lugs as at 143 and 144 may be applied. As here shown, the high frequency contacts 145 and 146 will engage the work in the manner comparable to FIG. 1 except that after the workpieces have advanced past the contacts 146, heating current will continue to be applied since the lug or lugs 143, 144 will continue to provide a heating path as at 147 therefor. Similarly when the workpieces are initially introduced to the welding region, current will start to be applied from the contacts to the forward ends of the workpieces by reason of the forward lug or lugs 140, 140a.

In FIG. 17 an embodiment of the invention is shown in a form for transversely welding together two preferably relatively thin workpieces as at 150, 151 along lines transverse to the longitudinal movement of the workpieces in the direction indicated by the arrow 152. Here the high frequency contacts connected to the source 28 may be applied to the upper surface of the thin workpiece 150, as indicated at 153, 154 so that the current path therebetween as shown in section in FIG. 18 will run transversely of the direction of movement of the workpieces and so as to momentarily heat same in the regions indicated by the dotted lines at 155. Here an upper pressure roller 156 may be interposed between the contacts, this roller preferably being of a suitable insulating material or having an insulation rim and same will serve to press the member 150 firmly down against the member 151 and down against the lower roller 157 as indicated in FIG. 18, momentarily as a desired line of transverse welding passes these rollers. Since as above stated with this embodiment the workpieces are preferably of quite thin material, they will be quickly heated to the desired reference depth for forming a transverse line of welding momentarily as the workpieces pass between the rollers shown. Since the transverse liens of welding are ordinarily to be spaced apart, the high frequency source may be connected to the contacts through a suitable pulsing device 43' so that the current will be applied to the contacts only during short spaced apart intervals as is mentioned in connection with the pulsing device 43 in FIG 1.

Various possible ways of holding the parts in the desired relationship during the welding will now be described in connection with the somewhat schematic diagrams of FIGS. 19A to 19D. All these figures are vertical sectional views of portions of the apparatus taken along planes transverse to the direction of movement of the workpieces through the welding region.

In FIG. 19A, upper and lower workpieces, for example as at 160 and 161, are being slidably advanced over a suitable supporting block or table 162 beneath the proximity conductor portion 34 which may be kept in a predetermined desired spaced relation to the upper workpiece 160 as by a strip of suitable heat resistant insulation material 163.

It may be noted that in some cases, such as where one sheet metal strip is being welded to another in accordance with the invention, the relative differences in the degree of expansion of portions of one with respect to the other may be such as to tend to cause warping or relative displacement or separation of the parts in unintended ways. Thus in some cases, it may be desirable to prevent these difficulties by suitably imparting to the advancing workpiece strips a small curvature. Thus as shown in FIG. 19A, the workpieces as shown in vertical transverse section have been curved somewhat by any suitable means so that same are upwardly concaved as shown. For like purpose, as shown in FIG. 19B, the workpiece strips 165 and 166 have been curved so as to appear concaved downwardly in transverse section as shown. In some cases, it may be preferred to have the upper workpiece concaved upwardly and the lower workpiece downwardly. And in any case, after passing the welding region and if desired, the workpiece may be flattened out again in any suitable known way. As further shown in this figure, the proximity conductor portion 34 may be flanked at each side by suitable insulation slide bars as at 167 suitably mounted by means, not shown, in positions to retain the workpieces down against a support 168 as they slide along underneath in a suitably spaced relation with respect to the proximity conductor 34.

As shown in FIG. 19C, the advancing workpieces 170, 171 are held down against a support 172 as by the use of gas pressure introduced through an inlet 173 to an enclosure 174, the lower sidewall edges of which as at 175 slidably engage or are mounted close to the upper workpiece 170. Thus gas pressure within the enclosure will serve to retain the workpieces down against the support while excess gas pressure may tend to leak out at the lower edges 175 of the enclosure.

FIG. 19D illustrates another arrangement in which a suitable magnet as at 176 may be placed in the supporting base 177 for holding one or both of the workpieces 178, 179 down against the support as they slide thereover.

In most instances, the invention as described above concerned embodiments wherein the current applying contact arrangement and the workpieces respectively are relatively advanced during the welding so as progressively to heat the metal along the desired line of welding up to welding temperature. Various aspects of the invention are also applicable in cases where during the welding the workpieces remain stationary with respect to the current applying contacts. For example, as shown in FIG. 20, a pair of workpieces as at 180, 181 may be spot welded together in the area indicated by the small horizontally extending dotted lines at 182. Here a pair of contacts as at 183, 184 are positioned to engage the upper surface of member 180 at opposite sides of a desired spot welding area 182. This figure illustrates structurally suitable forms for the high frequency current connections 185 and 186 for the contacts, these connections having cooling-fluid cavities as indicated by the dotted lines 187. With the arrangement of this FIG. 20 the current frequency is so chosen considering the resistivity of the metal workpieces and their permeability that the current between the contact will penetrate with a reference depth at least extending down through the stationary workpiece 180 and at least through the upper surface of workpiece 181 which is to be welded thereto at the spot weld area 182. After the current has been applied for a sufficient interval to heat this region to a plastic condition suitable for welding, a suitable hammer or pressure member 190 is arranged to be thrust down so that its lower end presses against the desired spot welding region and is held against an anvil 191 thereunder. A suitable mechanism may be provided so that this hammer piece 190 will strike the welding region with a quick blow or in some cases merely by momentary application of strong pressure. If this hammer member is brought down into engagement with the work after the heating current has been shut off, it will, of course, not interfere with the current flowing in the workpieces. However, if the hammer member is positioned down near the welding area during heating and if it is of conductive material, it will tend to become inductively heated in which event it may be water-cooled. Alternatively same may be made of nonconductive material or suitably shielded in a copper sleeve. In various of these ways, the hammer could be used if desired to hold the workpieces in intimate contact during heating to make sure the current flows to the desired reference depth into the lower workpiece. Of course arrangements may be provided for successively introducing the members to be welded into position for welding to there remain while the pulse of current is applied and for then removing the workpieces or moving them on to form another spot weld at a subsequent position thereon.

A somewhat similar embodiment of the invention is shown in FIG. 21 where an upper workpiece 200 is to be welded to a lower workpiece 201 along beneath a line extending from one contact 202 to another contact 203, these contacts being supplied with currents through connections 204, 205 respectively, like those shown in FIG. 20. Here the hammer means indicated at 206 may have its lower edge 207 positioned to extend along above the desired path of flow of the heating current so as to provide a proximity conductor in effect for concentrating the current along that path. That is, for example, if the hammer member 206 is made of copper, current will be induced therein so that it will control the current path by the proximity effect with respect to the workpiece 200 and after the workpieces have been heated at the desired welding region to the desired reference depth, the hammer 206 may be lowered to apply either a forcefully momentary blow or a high pressure blow to cause the heated workpieces to become welded with a good forged weld along between the lower surface of the upper workpiece and the upper surface of the lower workpiece.

FIGS. 22 through 25 show a pair of overlapping and contacting metal portions 208 and 209 which may be the opposite edge portions of a single strip being joined to form a seamed tube as shown, or which may be the ends of a pair of metal strips to be joined together. The strips may be made of steel, aluminum, brass, etc. It is assumed that the metal portions 208 and 209 are to be joined throughout the length of their contacting surfaces and are stationary with respect to current applying contacts. Current is supplied to one end of the strip 209 by means of a contact 211 in conductive engagement with the lower surface of strip 209 and which is connected by the conductor 212 to the high frequency source 28. A second contact 213 conductively engages the opposite end of the lower surface of the metal portion 209 and is connected by way of the proximity conductor 215 to the other terminal of the high frequency source 28. The contacts 211 and 213 are located adjacent the ends of the line of weld to be formed, and they are located as close as possible to the ends of the metal portions 208 and 209 in order that current will flow at such ends and heat the intervening surfaces to forge welding temperature. Preferably, fluid passageways are provided in the conductor 212 and the proximity conductor 215 which passageways extend to the contacts 211, and 213 so as to permit the supply of a cooling fluid, such as water, through such passageways and thereby cool the conductors and the contacts.

The proximity conductor 215 preferably is located as close as possible to the upper surface of the metal portion 208 consistent with the requirement that the proximity conductor be insulated from the metal portions. If desired, the insulation may be air as shown, but alternatively, a solid insulating material capable of withstanding the temperatures involved may be employed between the proximity conductor and the metal portion. It will be observed that at any given instant the current flowing in the metal portions 208 and 209 flows in a direction opposite to the direction of current flow in the proximity conductor 215. In the absence of the proximity conductor 215 placed as shown, the current would not be concentrated where the heating is desired and with some positions of the return conductor which would be used in place of the proximity conductor, the current would flow from the contact 211 to the contact 213 substantially only in the metal portion 209. However, because of the presence of the proximity conductor 215 the distribution of the current will be substantially as shown by the dotted lines 216 and 217 in FIGS. 24 and 25. In other words, the current entering or leaving the contact 213 will flow through the end portions of the metal portions 208 and 209 and upwardly into and along the metal portion 208 and along the portion 209 so as to provide a current distribution which corresponds to maximum current at the upper surface of the metal portion 208 and hence, at that part of the metal portion which is nearest the proximity conductor 215. The current is similarly distributed at the opposite end of the metal portions 208 and 209 where the current enters and leaves the contact 211.

The depth to which 86 per cent of the current flows, and hence the reference depth below the upper surface of the metal portion 1, is, as pointed out above, dependent upon the frequency of the current. Accordingly, the frequency is selected so as to provide a reference depth greater than the thickness of the upper metal portion 208, i.e., the metal portion nearest to the proximity conductor 215, and preferably a reference depth less than the combined thicknesses of the metal portions 208 and 209. In addition, as pointed out above, when low frequency current is used and the proximity conductor is omitted, the metal at the contacts and between the metal portions, heats rapidly and becomes molten before any substantial heating occurs in the metal along the line between the contacts. However, with the arrangement in FIGS. 22—25, the metal along the line reaches forge welding temperature without overheating at the contacts and at such contact points. It appears, therefore, that at higher frequencies the effective contact resistances are low as compared to the effective resistance of the metal along the desired weld line. Accordingly, while the frequency is made low enough to cause it to penetrate through the thickness of the metal portion 208 and into the metal portion 209, the frequency is also made high enough so that heating to forge welding temperature will be provided along the facing surfaces of the metal portions without overheating of other portions thereof such as the portions in line with and above the contacts 211 and 213. Preferably, the frequency is selected so as to be high enough to provide a reference depth less than the combined thicknesses of the metal portions in order that the current distribution will be confined to the metal where heating to welding temperature is desired and to prevent substantially all current flow in any conductive supporting part, such as an anvil, which may underlie the metal portions.

FIG. 25 illustrates by the broken lines 217 the use of a frequency which provides a reference depth approximately 1½ times the thickness of the metal portion 208, and although approximately 86 percent of the current will flow within such depth, there will, of course, be current flowing outside the area covered by the dotted lines 217. For this reason as well as for the reason that heat will be conducted to the metal outside of such area, there will be heating of the metal outside of the area covered by the dotted lines 217. The extent to which the metal outside of such area will be heated depends upon several factors, including the thermal conductivity of the metal, the magnitude of the current and the time during which the current is supplied to the metal portions. Accordingly, by suitably selecting the magnitude and frequency of the current and the time during which the current is supplied to the metal portions, the metal portions may be heated to the desired welding temperature along the surfaces between the metal portions 208 and 209, and when they have reached the desired welding temperature, they may be forced or pressed together so as to produce the desired line of weld. The metal portions may be pressed together during the heating thereof either with pressure sufficient only to hold them together or with pressure of a magnitude sufficient to forge weld them together when welding temperature is reached. When the welding temperature is reached, the current will be discontinued, but if desired, it may be reestablished at a lower value after the weld is made so as to provide heat treatment or annealing of the weld metal.

It has been found that using the principles of the invention, line welds can be produced in times ranging from a fraction of a second to a few seconds depending upon the materials, frequencies and magnitude of the current employed. For example, using a 150-kilowatt source providing current of a frequency of 10 kHz., it has been found possible to weld together two overlapping steel strips 4 inches wide and one-sixteenth inch thick in 6 seconds. At this frequency, the reference depth (above the Curie point) was approximately 1.8 times the combined thicknesses of the strips. As another example, a can body with a lock seam 7⅝ inches long and formed from a tin-plated steel strip 7⅝ inches wide and 0.010 inch thick was heated to welding temperature at the seam in approximately 90 milliseconds using a 140-kilowatt, 450 kHz. generator. After heating, the can body was moved to a forging position in approximately 115 milliseconds where the overlapping parts of the seam were forge welded together. At this frequency the reference depth (above the Curie point) was approximately 0.9 times the combined thickness of the four metal layers forming the lock seam.

Using apparatus described hereinafter, the metal portions may be forged either in the same position in which they are heated or, if they can be moved rapidly so as to prevent lowering of the temperature below the desired welding temperature, they may be forged at a separate position.

If the metal portions are subjected to only relatively small forge welding pressures after they have been heated to welding temperature, a weld will be produced with only minor deformation of the metal portions, and after welding they will have substantially the same appearance as that shown in FIG. 25. However, if desired, the metal portions 208 and 209 may be subjected to relatively high forge welding pressures so as to produce a seam having substantially the same thickness as the individual metal portions. Thus, as shown in FIG. 26, the metal portions 208 and 209 may be compressed or "mashed" so that the resulting seam has substantially the same thickness as either of the metal portions alone and will have a seam line 218 which extends diagonally from one surface to the other of the metal portions. Such working of the metal refines the grain structure thereof, and the seam can be made substantially invisible to the naked eye.

In the embodiments described immediately hereinafter, the principles described in connection with FIGS. 22—25 apply. Thus, the metal portions are held in overlapping relation along the desired line of weld and are held in conductive contact at least at the ends of such line. High frequency current is supplied to the metal portions by conductive contacts adjacent the ends of such line and adjacent the points where the metal portions are held in contact, and such contacts are maintained in fixed relation to the metal portions during the supply of welding current thereto. One of the contacts is connected to a terminal of high frequency source, and the other contact is connected to another terminal of the source through a proximity conductor which follows the desired line of weld and is in close proximity to but insulated from the metal portions and such line. The connections of the contacts and proximity conductor are such that, at any given instant, the direction of current flow in the metal portions is opposite to the direction of current flow in the proximity conductor. Also, the frequency of the current is such that the reference depth is greater than the thickness of the metal between the proximity conductor and the metal portion more remote from the proximity conductor. In addition, the frequency is high enough so that the metal engaged by the contacts and the metal at the contact points between the metal portions themselves do not overheat, e.g. melt, but the metal along the line of weld reaches forge welding temperature during the time that current is supplied thereto. The current is of a magnitude and is maintained for a time sufficient for the metal along the line of weld to reach forge welding temperature and when it reaches such temperature, the metal portions are pressed together along the length of the line. Preferably, the frequency is such that the reference depth does not exceed the combined thicknesses of the metal portions and, if desired, multiple rather than single contacts may be used to supply the current.

If desired, a diagonally extending seam line can also be produced by scarfing the edges of the metal portions 208 and 209 as shown at 219 in FIG. 27, and selecting the frequency so that the current distribution is substantially that shown by the broken lines 220 in FIG. 27. In this case, the reference depth need not exceed the thickness of the metal portion 208 but should be greater than the thickness of that portion of the metal portion 208 which underlies the proximity conductor 215 so that the current will penetrate into the metal portion 209. In other words, the reference depth is selected so as to be greater than the thickness of the metal which intervenes between the proximity conductor and the underlying metal portion 209.

In FIGS. 22 through 27, the invention has been illustrated as applied to metal portions having square or scarfed edges, but the principles of the invention are applicable to the welding together of metal portions having various different configurations. For example, as illustrated in FIG. 28, the invention may be used to weld together a metal portion 221, having a square edge and a metal portion 222, having a downwardly folded edge 224. With such a combination, the frequency may be chosen so as to provide a reference depth greater than the thickness of the metal portion 221 but less than the combined thickness of the metal portions 221 and 222 so that the current distribution will be as illustrated by the broken lines 223. Alternatively, the frequency may be selected so as to provide a reference depth which is greater than the combined thicknesses of the metal portions 221 and 222 and so that the current will penetrate into the folded edge portion 224 as illustrated in FIG. 30. With the current distribution as shown in FIG. 28, the resulting welded metal may have the form illustrated in FIG. 29, but if a current distribution like that shown in FIG. 30 is employed, the folded edge 224 will also be welded to the main body of the metal portion 222 at the same time that the metal portions 221 and 222 are welded together.

Figure 31:
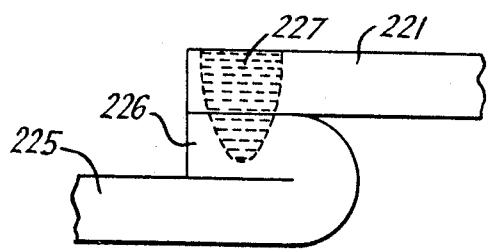

FIG. 31 illustrates the welding together of a square-edged portion 221 and a metal portion 225 having an upwardly folded edge 226. The dotted lines 227 illustrate the current distribution when the frequency is selected so as to have a reference depth less than the combined thicknesses of the metal portions 221 and 225, but the frequency may be selected so as to have a greater reference depth similar to that illustrated in FIG. 30.

Figure 32:
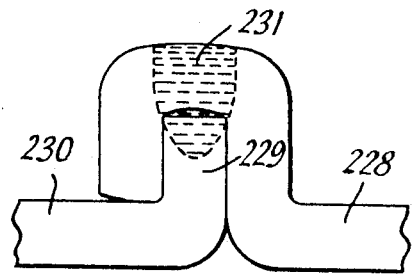

FIG. 32 illustrates the application of the invention to the production of a weld between parts of what is commonly known as a partial lock seam. The metal portion 228 has its edge formed so as to provide a U-shaped recess therein which receives the upturned edge 229 of a metal portion 230. With the proximity conductor disposed above the upturned edge 229 and suitable selection of the current frequency, the current distribution may be made substantially that shown by the area covered by the dotted lines 231.

Figure 33:
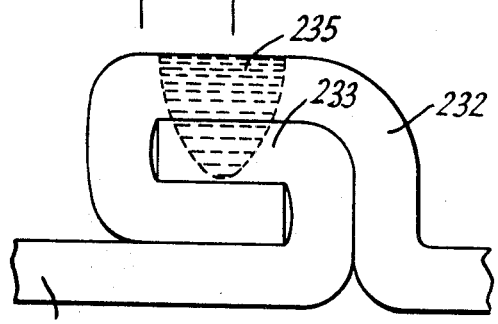
Figure 34:
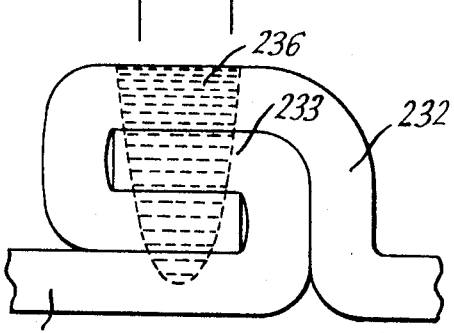

FIGS. 33 and 34 are similar to FIGS. 10 and 11, which illustrate a lock seam, and illustrate alternative depth of penetration of the current into the seam. A metal portion 232 is formed as shown so as to provide a recess therein for receiving the formed edge 233 of the metal portion 234. After being mechanically formed and locked together as shown in FIGS. 33 and 34, the edge portions may be heated with current of a frequency which will provide a reference depth and current distribution illustrated by the broken lines 235 in FIG. 33, and hence a reference depth which is substantially equal to the thickness of the metal portion 232 plus the thickness of the metal portion 234. Alternatively, the frequency may be selected so as to provide current distribution and reference depth as shown by the broken lines 236 in FIG. 34, and hence a reference depth which is greater than twice the thickness of the metal portion 232 plus the thickness of the metal portion 234.

Figure 35:
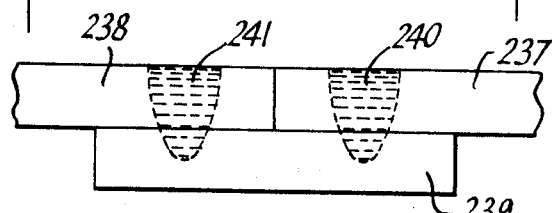

The principles of the invention may also be used as illustrated in FIG. 35 to weld two metal portions 237 and 238 to a third metal portion or tie plate 239. In this embodiment it is contemplated that the metal portion 237 would first be welded to the plate 239 using a current distribution illustrated by the broken lines 240 and the metal portion 238 would thereafter be welded to the plate 239 using a current distribution illustrated by the broken lines 241. However, as described hereinafter in connection with FIG. 44, both current distributions may be produced simultaneously so that the metal portions 238 and 239 may be simultaneously welded to the plate.

Figure 36:
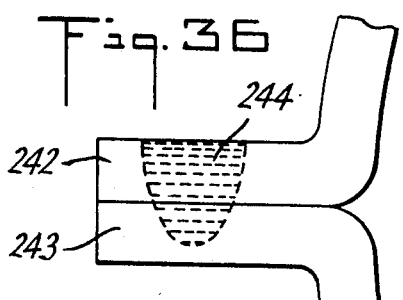

The principles of the invention may also be used to weld together a pair of flanges 242 and 243 as illustrated in FIG. 36. Thus, the flanges 242 and 243 may form, for example, the flanged edges of a single strip or the flanged edges of a pair of mating parts used to form a tank, such as a rectangular tank. The frequency may be selected so as to provide the current distribution illustrated by the broken lines 244 in FIG. 36.

Figure 37:
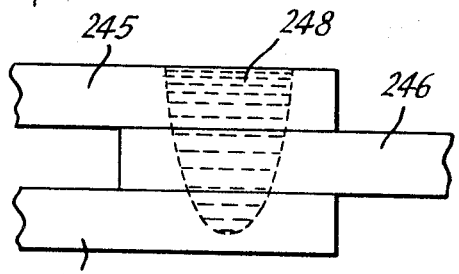

As illustrated in FIG. 37, the method and apparatus of the invention may be used to weld together simultaneously three separate metal portions 245, 246 and 247 with the frequency selected so as to provide a current distribution illustrated by the broken lines 248. Thus, the frequency is selected so as to have a reference depth greater than the combined thickness of the metal portions 245 and 246 but less than the combined thicknesses of the three metal portions.

Figure 38:
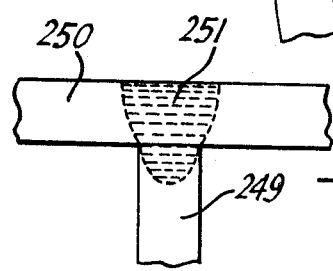

As illustrated in FIG. 38, the principles of the invention may be employed to weld the edge surface of a metal portion 249 to a side surface of a metal portion 250. Again, the frequency is selected so as to provide a reference depth greater than the thickness of the metal portion 250 and may be selected so as to provide a current distribution illustrated by the broken lines 251.

In the arrangement illustrated in FIGS. 22 through 24, it will be noted that the contacts 211 and 213 engage the lower surface of the metal portion 209, and hence the surface of the metal portion which is most remote from the proximity conductor 215. If the contacts 211 and 213 engage the upper surface of the metal portion 208 and hence the surface nearest the proximity conductor 215, the current flow may be such that insufficient current will flow at the ends of the surface of the metal portion 209 to be welded to the metal portion 208 to produce the desired welding temperature at such ends during the time it takes for the remainder of the surface to reach welding temperature. Accordingly, the weld at the ends of the metal portions, if produced, may not be of the same nature and quality as the remainder of the weld. However, by placing the contacts 211 and 213 as shown in FIG. 22, the current must also flow through the ends of the metal portion 209. If the contacts engage the side edge surfaces of the metal portion 209, the desired heating of the ends of the metal portion 209 would also be obtained, but normally, in order to obtain rapid heating to welding temperature, the current should be of a magnitude which requires the use of contacts having a contacting area equivalent to a circle with a diameter of one-fourth inch or greater. Since the invention is primarily applicable to the welding together of relatively thin sheets of metal, e.g. 0.015 inch or less in thickness, it is not possible to obtain relatively the desired area of contact between the contacts and the side edge surfaces of the metal portion 209 when the thickness of the metal portion is less than approximately one-fourth inch. However, it is to be understood that when the metal portion farthest from the proximity conductor has a sufficient thickness, the contacts may be applied to the side edges thereof rather than to the lowermost surface thereof as illustrated in FIGS. 22 and 24.

Similarly, if the lowermost metal portion is longer than the uppermost metal portion, the contacts may be applied to portions of the lowermost metal portion other than the surface thereof most remote from the proximity conductor. It is to be understood that the terms "lowermost" and "uppermost" as used herein are relative only and are used for ease in explaining the invention. As used herein, the expression "lowermost portion" means the metal portion most remote from the proximity conductor, and the expression "uppermost portion" means the metal portion which is nearer to the proximity conductor.

FIG. 39 illustrates, partly schematically, the use of the invention in the welding of a metal portion 252 to a shorter metal portion 253. This embodiment illustrates the fact that the contacts 211 and 213 may be applied to the uppermost surface of the lowermost portion 252 beyond the ends of the metal portion 253. Similarly, if it is desired to produce a line of weld which does not extend completely from end-to-end across the widths of the stationary metal portions, the contacts may engage a surface of the uppermost metal portion. Thus, as shown in FIG. 40, if it is desired to produce a uniform line of weld extending from approximately the point designated by the reference numeral 254 to approximately the point designated by the reference numeral 255 between a pair of metal portions 256 and 257, the contacts 211 and 213 may engage the upper surface of the metal portion 256 and the current distribution may be made to conform to that indicated by the broken lines 258.

As pointed out above, the reference depth for a given material depends upon the frequency of the current employed. Such reference depth remains the same even though a proximity conductor is employed, but the proximity conductor changes the relative width of the current path and the current distribution within such reference depth. The proximity conductor not only confines the current to a narrow path but also increases the relative concentration in the metal nearest the proximity conductor. Generally, a linear proximity conductor will be employed which will produce a weld extending along a straight line, but as described above, the proximity conductor may be curved or bent so as to produce a current path which is nonlinear. In addition, the current distribution may be varied along a path underlying the proximity conductor by varying the spacing of the proximity conductor with respect to the metal, a greater spacing lowering the concentration, or the shape of the proximity conductor itself may be varied.

FIG. 41 illustrates the use of a proximity conductor having wider portions adjacent the ends of the metal portions 208 and 209 so as to reduce the current concentration in such ends. As pointed out above, the use of contacts engaging the lowermost surface of the metal portion 209 causes the current to flow through that metal portion at the ends thereof and, since there is no metal outwardly of the ends, there may, in some instances, be a tendency for the metal portions to overheat at such ends during the time required for the remainder thereof to reach the desired welding temperature. Therefore, to reduce the concentration of the current at such ends, the proximity conductor 215 is provided with a pair of enlarged portions 259 and 260 which widens the current path and hence, reduces the concentration of the current and the heating in the metal portions therebelow. FIG. 42 when compared to FIG. 25 illustrates the effect of the enlarged or widened portions 259 and 260 on the current distribution, the current distribution below the enlarged portion 260 being represented by the broken lines 261. As shown in FIG. 42, the current is less concentrated in the portions below the enlarged portion 260 and is spread out over a wider area. Accordingly, the heating below the enlarged portion 260 will be at a slower rate.

If it is desired to concentrate the current nearer the edge surface of the metal portion 208 and to increase the current in the metal portion 209, the proximity conductor 215 may be offset with respect to the metal portion 208 in the manner illustrated in FIG. 43. Thus, with the proximity conductor 215 offset as shown, the current is increased at the edge surface 262 of the metal portion 208 and the current in the metal portion 209 is increased and its path is shifted to the right as compared with the current path illustrated in FIG. 25. Such an arrangement is particularly useful in welding together two steel portions using a frequency such that below the Curie point of the steel the depth of penetration is less than the thickness of the metal portion 208. With such a frequency the metal portion 208 would heat first if it is between the proximity conductor 215 and the metal portion 209, the current not penetrating to the metal portion 209 until the metal portion 208 is heated to the Curie point at which time the current will penetrate through to the metal portion 209.

Offsetting the proximity conductor 215 with respect to the metal portions to be joined also has the advantage that the metal portions may be forged together without moving the proximity conductor. As shown in FIG. 43, the metal portions 208 and 209 may be supported on an anvil 263 of either conductive or nonconductive material, and they may be pressed together during the heating thereof by a hammer or forging bar 264 which is pressed in the direction of the arrow 265 by any conventional means. To prevent the flow of current in the forging bar 264, it is made of nonconductive material. With the arrangement in FIG. 43, the force applied to the forging bar 264 during heating may be only sufficient to press the metal portions together and may be increased to forge weld the metal portions together after they have reached welding temperature. Alternatively and preferably, the force applied during heating may be sufficient to produce a forge weld and the weld will be formed as soon as welding temperature is reached. It is advantageous to press the metal portions against each other during the heating thereof so as to reduce warping or buckling thereof during heating.

To provide a pair of separate current paths, the proximity conductor may be shaped in cross section as shown in FIG. 44. Proximity conductor 215 is curved in cross section so as to provide a pair of faces 266 and 267 which are closer to the metal portions 237 and 238 than the remainder of the proximity conductor 215. With such a configuration, the current will concentrate in two paths indicated by the broken lines 268 and 269 so that the metal portions 237 and 238 may be simultaneously welded to the plate 239.

The width of the current path in the metal portions may be further reduced by the use of a magnetic element extending at least partly around the proximity conductor and in close proximity to the metal portions to be welded. As illustrated in FIG. 45, the proximity conductor 215 is surrounded by a magnetic element 270 having a recess 271 therein for receiving the proximity conductor 275. If magnetic element 270 has a low conductivity, it may engage the proximity conductor 215, but if it has a relatively high conductivity, the proximity conductor should be insulated therefrom such as by air or solid insulation. The faces 272 and 273 of the magnetic element extend close to the metal portions and, in some cases, may even contact the metal portions. For example, if the magnetic element is made of an insulating material such as a magnetic ceramic material, then it may contact the metal portions. Also, if the magnetic element is made of a material or constructed in such a way that the conductivity along the length thereof is small as compared to the metal portions being joined, the surfaces 272 and 273 may engage the metal portion. For example, the magnetic element 270 may be made of a stack of relatively thin laminations which are insulated from each other in a manner similar to that employed in the manufacture of transformer cores. The material from which the magnetic element is made depends primarily upon the frequency employed, magnetic steels being satisfactory for low frequencies, e.g., up to 20 kHz., but high frequency magnetic materials, such as magnetic ceramic materials, being preferred for higher frequencies.

FIG. 46 illustrates a combined proximity conductor, forging bar and magnetic element. The proximity conductor 215, which is provided with flexible or sliding connections (not shown) to the remainder of the circuit so as to permit movement thereof, is encased in a forging bar 274 of a high-temperature insulating material such as a ceramic. The forging bar 274 is in turn surrounded by a magnetic element 275 of the same type as magnetic element 270 described in connection with FIG. 45. The pressing surface 276 of the forging bar extends below the surfaces 277 and 278 of the magnetic element 275 so as to permit the heated material to be compressed when the forging bar 274 is moved downwardly.

FIGS. 47 and 48 illustrate one preferred embodiment of the apparatus of the invention for producing line welds between opposed edges of a single metal strip formed into the shape of a tube. Such embodiment is particularly useful in the manufacture of can bodies. A finite length metal strip 279 is formed into the shape of a cylinder or tube with overlapping edge portions 280 and 281. The so-formed tube is mounted in welding position on a mandrel 282 having a conductive insert 283 therein. The insert is made of a highly conductive material, such as copper, and serves both as an anvil during the forging process and as the contact means for supplying current to and from the overlapping edges 280 and 281. A tube 285 passes through insert 283 for circulating a cooling fluid therethrough. Insert 283 contacts the edge portion 281 at its ends and may also contact it throughout its length. The edge portions 280 and 281 are held against each other by the nonconductive forging bar 286 which is similar to forging bar 276 described in connection with FIG. 46. However, it differs therefrom in that it has an opening 287 therethrough which is larger than the diameter of the proximity conductor 215 so as to permit movement of the forging bar 286 with respect to the proximity conductor during the forging of the edge portions 280 and 281. Forging bar 286 is carried by a shaft 288 which is movable up and down in the directions indicated by the double-ended arrow 289. Forging bar 286 is held against the edge portions 280 and 281 during the heating thereof and the force thereon is either already sufficient or is increased when welding temperature is reached so as to forge the edge portions together.

A pair of contacting rods or bars 290 and 291 are carried by a plate 292 which is also movable upwardly and downwardly so as to raise and lower contacting bars 290 and 291. Plate 292 is pressed downwardly by a spring 293 during the time that current is supplied to the edge portions 280 and 281 and therefore the contacting bars 290 and 291 engage the insert 283 near the ends thereof. Proximity conductor 215 is also supported from the plate 292 and moves therewith. Proximity conductor 215 is tubular so as to permit the passage of cooling fluid therethrough, and it passes through contacting bar 290 thereby providing conductive contact therewith and also aiding in the cooling thereof. Contacting bar 291 also has a tube 294 passing therethrough so as to permit the passage of cooling fluid through the tube 294 and hence cooling of the contacting bar 291.

In operation, the plate 292, and hence the contacting bars 290 and 291 and the proximity conductor 215, and the bar 286 are raised to permit the insertion of the formed strip 279 over the mandrel 282 and under the forging bar 286. Thereafter, plate 292 and bar 286 are moved downwardly to cause the bar to press the edge portions 280 and 281 together and to cause the contacting bars 290 and 291 to contact the insert 283. The proximity conductor 215 and the contacting bar 291 are connected to a high frequency source, and when the forging bar 286 and the contacting bars 290 and 291 are so positioned, the high frequency current is supplied to contacting bar 291 and proximity conductor 215 for the period of time required to heat the facing surfaces of end portions 280 and 281 to forge welding temperature along their lengths. When the desired forge welding temperature is reached, the force applied to the shaft 288 either is sufficient or is increased so as to forge the edge portions 280 and 281 together along their lengths. Thereafter, forging bar 286, proximity conductor 215, and contacting bars 290 and 291 are raised, permitting removal of the welded tube.

As long as there is contact between the metal portions at the ends of the line of weld, it is unnecessary from the electrical standpoint that there be contact therebetween intermediate such ends. Accordingly, although they may be in contact intermediate the ends of the line of weld and although the means for supplying current to the metal portions may extend the full length thereof, as illustrated in FIG. 47, nevertheless, it is necessary only to maintain the metal portions in contact at the ends of the line of weld and to have the current-supplying means contact them at such ends.

FIG. 49 illustrates diagrammatically means for holding the metal portions together only at the ends of the line of weld and contact means engaging the metal portions only at such ends. The metal portions 208 and 209 are pressed together at their ends by a pair of rods or pins 295 and 296 and a pair of upstanding portions 297 and 298 on a conductive bar 299. The upstanding portions 297 and 298 correspond respectively to the contacts 213 and 211 in FIG. 22, and current is supplied to one end of the bar 299 and hence to the upstanding portion 298 by a conductor 300 which is conductively connected to the opposite end of bar 299. It will be noted that the metal portions 208 and 209 are held together only at the ends thereof which are between, respectively, the pin 295 and projection 297 and the pin 296 and projection 298. Also, it will be noted that since the metal portions 208 and 209 are not held intermediate their ends, they may or may not be in contact intermediate their ends.

FIG. 50 illustrates a modified form of the embodiment shown in FIG. 49 in which the metal portions are held together only at their ends by pins 295 and 296 and the projections 297a and 298a on the separate supports 301 and 302. In addition, the current feed to the metal portions 208 and 209 is modified so as to provide, in effect, a pair of aligned proximity conductors. Thus, lead 303 is connected to one terminal of the high frequency source and extends along and in close proximity to the upper surface of the metal portion 208 and then to the support 302 thereby providing a first proximity conductor 304. The lead 305 is connected to the other terminal of the high frequency source and similarly extends along and in close proximity to the upper surface of the metal portion 208 and to the other support 301 thereby providing a second proximity conductor 306. The two proximity conductor 304 and 306 act in the same manner as the single proximity conductor 215 but, by reason of the configuration shown, the maximum voltage between the proximity conductors 304 and 306 and the surface of the metal portion 208 is less than the maximum voltage between the proximity conductor 215 and the upper surface of the metal portion 208 and may be substantially one-half of the value thereof. Thus, by employing the arrangement shown in FIG. 50, the possibility of arcing between the proximity conductor and the metal portion 208 is reduced, and the spacing between the proximity conductors 304 and 306 and the metal portion 208 may be reduced.

Instead of contacting the metal portions 208 and 209 only at single points at the ends of the desired line of weld, such metal portions may be contacting at multiple points at their ends. Thus, as shown in FIG. 51, metal portions 208 and 209 may be engaged by a pair of highly conductive bars 307 308, such as bars of copper, which are connected in parallel at their opposite ends and which extend for the full width of the metal portions 208 and 209 in the direction of the desired line of weld. As viewed in FIG 51, the ends of bars 307 and 308 nearest the viewer are conductively connected together and to the proximity conductor 215, whereas the ends thereof most remote from the viewer are conductively connected together and to one terminal of the source so that current flows in the same direction therein and in a direction opposite to the current flow in the proximity conductor. The path of the current from the bars 307 and 308 and through the metal portions 208 and 209 is indicated by the dotted lines 309 and 310.

The proximity conductor is carried by a forging bar 311 corresponding to the construction shown in FIG. 46, and the metal portion 209 is supported by an anvil 312 which preferably is made of an insulating or low-conductivity material. Bar 307 is movable upwardly and downwardly as indicated by the double-ended arrow 313 and is urged upwardly by conventional means not shown so as to maintain conductive contact with the metal portion 208. However, as forging bar 311 moves downwardly to force the metal portions 208 and 209 together, the bar 307 also moves downwardly to permit downward movement of the metal portion.

FIG. 52 illustrates a modified form of the embodiment shown in FIG. 51 which is useful in the event that the metal portions 208 and 209 are moved after heating to a forging position. In FIG. 52, metal portions 208 and 209 are supported by a U-shaped member 314 and are held against the member 314 by a pair of bars 315 and 316. Member 314 may be made of a conductive material such as copper, in which event bars 315 and 316 may be made of insulating material, although they may also be made of conductive material. Conversely, if bars 315 and 316 are made of conductive material, the member 314 may be made of insulating material rather than conductive material.

If member 314 is made of conductive material, it is connected to the source of high frequency current and to the proximity conductor 215 in the same manner as the insert 283 described in connection with FIGS. 47 and 48. Thus, as viewed in FIG. 52, the end nearest the viewer is connected to the proximity conductor 215 and the end farthest from the viewer is connected to one terminal of the high frequency source, the member 314 acting in the same manner insofar as current supplied to the metal portions 208 and 209 is concerned as the bars 307 and 208 described in connection with FIG. 51.

If bars 315 and 316 are made of conductive material, they may be connected to the source and to the proximity conductor in the same manner as the bars 307 and 308 described in connection with FIG. 51. However, if magnetic material is not between the proximity conductor 215 and the bars 315 and 316 and adjacent the portions 208 and 209, the spacing between the faces thereof nearest the proximity conductor 215 and the proximity conductor should be at least five times the spacing of the proximity conductor with respect to the metal portion 208 in order to reduce the current flowing in said bars 315 and 316. Thus, bars 315 and 316 may be used to supply the current to the metal portions 208 and 209 or the member 314 may be used to supply the current thereto. Normally, only the bars 315 and 316 or the member 314 would be used to supply current to the metal portions 208 and 209, but current may be supplied thereto by the bars 315 and 316 and the member 314 simultaneously.

In the operation of the arrangement shown in FIG. 52, current will flow from the bars 315 and 316 or the member 314 into the metal portions 208 and 209 and underneath the proximity conductor 215 and will then, at the opposite ends of the metal portions 208 and 209, flow back into the bars 315 and 316 or the member 314 and then to the proximity conductor 215 along which the current will flow in the opposite direction back to the high frequency source.

FIG. 53 illustrates an embodiment similar to FIG. 19B and shows stationary curved metal portions 208 and 209 supported on a conductive bar 319 having a curved surface 320 conforming to the curvature of the metal portions 208 and 209. A proximity conductor 215 is similarly curved so as to follow the curvature of the surface of the metal portion 208. The leads 321 and 322 are fixed with respect to portions 208 and 209 and are connected to the terminals of high frequency source. The production of a weld between the metal portions 208 and 209 is accomplished in the manner set forth above.

FIG. 54 and 55 illustrate a further embodiment of the invention which permits the metal portions to be forged together without moving the proximity conductor or the metal portions after welding temperature is reached. Also, although the forging bar may be made of insulating material, this embodiment permits the use of a metal forging bar. The metal portions 208 and 209 are supported on an anvil 323, which may be made of a conductive material such as copper, and are held in their welding positions by conventional means not shown and by the forging bar 328 if it is made of insulating material. The left end of anvil 323, is connected to one terminal of a high frequency source and supplies current to metal portions 208 and 209 in the same manner as the insert 283 described in connection with FIG. 47. A pair of proximity conductors 324 and 325 are mounted above metal portions 208 and 209 and are connected at their left ends to the other terminal of the high frequency source and at their right ends to a block 326 which is either part of, or conductively secured to, the anvil 323. With the pair of proximity conductors 324 and 325, the current distribution is substantially that indicated by broken lines 327 in FIG. 55, and because of the use of a pair thereof and the positioning shown, a forging bar 328, which may be made of metal, can pass between the proximity conductors 324 and 325 for the purpose of forging the metal portions together after they are heated to welding temperature. If the forging bar 328 is made of conductive material, preferably it is withdrawn from spacing between the proximity conductors 324 and 325 during the heating of the metal portions 208 and 209.

Instead of disposing the proximity conductors 324 and 325 on the same side of the metal portions 208 and 209, they may be disposed as shown in FIG. 56. Proximity conductor 325 is disposed above the upper surface of the metal portion 209, and adjacent the end surface of the metal portion 208. Proximity conductor 324 is disposed below the lower surface of the metal portion 208 and adjacent the end surface of the metal portion 209, and the current distribution will be approximately that shown by the broken lines 329 and 330. If desired, proximity conductors 324 and 325 may be partially surrounded by magnetic elements 331 and 332 which magnetic elements may be constructed like magnetic element 270 described in connection with FIG. 45.

FIG. 57 illustrates a modified form of embodiment shown in FIGS. 47 and 48 and is particularly adapted for use with automatic can body processing machinery. In FIG. 57, a plate 333 is urged upwardly by a pair of springs 334 and 335 and carries a forging bar 336 of insulating material which in turn carries a proximity conductor 337, the forging bar and proximity conductor construction being like that described in connection with FIGS. 46 and 51. Plate 333 also carries a pair of contact bars 338 and 339 which are engageable with a conductive anvil 340 which is the same as the insert 283 described in connection with FIG. 47. The contact bars 338 and 339, the anvil 340 and the proximity conductor 337 are fluid cooled in any conventional manner.

A bar 341, connected to one terminal of a high frequency source, is mounted in a fixed position and so as to have sliding contact with the contact bar 339. The conductor 342 is connected to one end of the proximity conductor 337, the other end of which is connected to a bar or block 343 having sliding contact with the contact bar 338.

Plate 333 also carries a roller 344 engageable with a cam 345 which rotates in the direction indicated by arrow 346. In the position of the cam shown, the plate 333 applies forging pressure to the overlapping edge portions of the tube 347 by way of forging bar 336. When welding temperature is reached, the pressure applied by way of forging bar 336 produces a forge weld between the overlapping edge portions. Thereafter, as cam 345 rotates further, plate 333 and the parts supported therefrom are raised, permitting the welded tube 347 to be ejected to the left, where it is engaged by the rollers 348 and 349 and thereby moved to a succeeding position in the apparatus performing operations on the can bodies. While the cam 345 is in the position which permits the plate 333 to rise, a formed, unwelded tube is inserted into the position shown in FIG. 57 by moving it over the anvil 340 from the right as viewed in FIG. 57. When the cam again rotates to the position where it applies pressure to the overlapping edge portions, current is supplied to the edge portions for the time required to heat them to forge welding temperature, at which time they are welded together in the manner just described.

FIG. 58 illustrates diagrammatically an embodiment of the invention which is particularly adapted to processing smaller tubular members, such as can bodies, in a stepwise fashion. As previously mentioned, the overlapping metal portions may be heated to welding temperature and then the article of which the metal portions form a part may be moved to a second position where the metal portions are forge welded together. If the tubular body is mechanically formed with edge portions which interlock, such as with a lock seam of the type shown in FIGS. 33 and 34, the edge portions will retain their relative positions after heating thereof and during movement from the heating position to the forge welding position.

In FIG. 58, the heating position is beneath a clamping bar 351 made of insulating material, and it, as well as the proximity conductor 355 and the contacts 352 and 354, are movable upwardly and downwardly with respect to the mandrel 353. With the clamping bar 351, the contacts 352 and 354 and the proximity conductor 355 in their raised positions, a metal strip formed into tubular shape with overlapping and interlocked edge portions is advanced stepwise from the right over the mandrel 353 and into the welding position beneath the clamping bar 351. After it is moved into such position, the clamping bar 351, the contacts 352 and 354 and the proximity conductor 355 are lowered into the positions shown in FIG. 58. In such positions the heating current flows through the overlapping edge portions by way of the contact 352 and the conductive mandrel to the contact 354 and through the proximity conductor 355. Clamping bar 351 presses firmly against the overlapping edge portions, preventing warping or buckling thereof.

After the current has been passed through the overlapping edge portions for a time sufficient to heat them to welding temperature, clamping bar 351, contacts 352 and 354 and proximity conductor 355 are raised, permitting the tube with heated, overlapping edges to be moved in stepwise fashion to a forging position beneath the forging hammer or bar 356. At this position the heated, overlapped edge portions are supported on an anvil 357 carried by the mandrel 353 and, if desired, the anvil may be heated so as to reduce chilling of the overlapped edge portions. In the forging position, forging bar 356 is lowered and applies force to the heated, overlapping edge portions sufficient to forge weld them together.

Thereafter, the forging bar 356 is raised, and the welded tube is moved stepwise to the left where it may be removed from the mandrel 353 and/or further processed by other apparatus. It will be noted that by proper selection of the heating time, a tube may be heated in the first position while another tube is being forged in the second position so that tube may be fed to and removed from the welding apparatus in cyclical manner and at a high rate.

Instead of moving the heated metal portions to a separate position after they have been heated to welding temperature and then forging the metal portions together at such separate position, the metal portions may be forged together as they are removed from the heating unit. FIG. 59 illustrates an embodiment of the invention in which the tube formed by the metal strip 350 is forged together at the heated portions by a pair of rollers 358 and 359 as the tube is removed from the mandrel 360. The mandrel is made of high conductivity material, such as copper, and carries the roller 359. The contact 361 is connected to a terminal of the high frequency source and is movable upwardly and downwardly with respect of mandrel 360. The contact 361 engages the mandrel 360 and supplies current, in the manner described above, to the overlapping metal portions. The ends of the overlapping metal portions are held in contact by a downwardly urged rod or pin 362 and by the rollers 358 and 359 during the passage of current through the overlapping portions.

The conductive roller 358 is carried by conductive aim 363 which acts as the proximity conductor, and the arm 363 is connected at its end 364 to the other terminal of the high frequency source.

In operation, contact 361, arm 363 and pin 362 are raised, permitting a formed tube to be inserted over mandrel 360 into the position shown. Thereafter, contact 361, arm 363 and pin 362 are lowered and current is supplied to the overlapping edge portions. When the overlapping edge portions have been heated to welding temperature the current is discontinued, pin 362 is raised and the tube is moved to the left between rollers 348 and 349, causing the overlapping edge portions to be forged together as they pass between the rollers. If desired, either or both of the rollers may be driven rollers.

In many cases, the material which must be used for supplying current to the overlapping metal portions cannot be subjected to the temperatures encountered in welding the metal portions together. For example, if the metal portions are made of steel and the current-supplying means or anvil is made of a material such as copper, the current-supplying means must be cooled as described above in order to prevent melting of the current-supplying means. However, this places a relatively low-temperature object in contact with the metal portion which it is desired to heat, and it may be difficult in such cases to heat the lower metal portion to the desired temperature at the same time that the upper metal portion reaches the desired welding temperature. FIG. 60 illustrates a current-supplying means having two parts which permits the overlapping portions to be heated to be out of direct contact with the current-supplying means. The proximity conductor has been omitted for ease in illustration, but it would be in conductive contact with the tiepiece 365 which interconnects the pair of conductive bars 366 and 367. The opposite ends of the bars 366 and 367 are conductively connected together by tiepiece 268 which is connected to a terminal of the high frequency source. The bars 366 and 367 act not only to supply current to the overlapping metal portions of the lock seam 369 but also can be used as an anvil for subsequent forging of the lock seam 369. Thus, during the heating of the lock seam 369, it is in the position illustrated and hence is between the bars 366 and 367, and in this position the overlapping metal portions of the lock seam are not in direct contact with the bars, but current will flow along the width of the seam in the manner described above. After the overlapping metal portions of lock seam 369 are heated to welding temperature, the seam may be moved to a different position in which it will be subjected to pressure from a forging bar and the overlapping metal portions will be forge welded together.

With the arrangement shown in FIG. 60, the lock seam 369 also is not engaged at its upper surface during the heating thereof. While the strip 373 may be held in other ways, if it is of magnetic material, holding of the lock seam 369 in the position shown in FIG. 60 may be accomplished by means of the magnetized element 374 which may, for example, be a permanent magnet.

An alternative embodiment of the apparatus shown in FIG. 60 is illustrated in FIGS. 61 and 62. The embodiment of these two figures is essentially one-half of the embodiment shown in FIG. 60 with the magnetized element 374 omitted and with the strip 373 held against a conductive anvil 375 by means of a bar 376. After the lock seam 369, which is offset with respect to the anvil 375, has been heated to welding temperature and the bar 376 has been raised, the strip 373 may be moved to a second, or forging, position. In this forging position, forging pressure is applied to the lock seam 369 by a forging bar in the manner previously described, producing a forge weld between the overlapping metal portions of the lock seam 369.

FIG. 63 illustrates the application of the principles described in connection with FIG. 40 to the production of a series of interconnected line welds between a pair of overlapping metal portions. In FIG. 63, the overlapping metal portions 379 and 380 are shown mounted on an anvil 381, and the lengths thereof are greater than the distance between the contact 382 and the contact 383. The proximity conductor is designated by the reference numeral 215. The parts are shown in the position thereof after line welds have been produced between the metal portions 279 and 380 at the portions thereof designated by the letters A and B.

In operation of the arrangement shown in FIG. 63, the contacts 382 and 383 are raised, permitting the length of the metal portions 379 and 380 designated by the letter A to be inserted under the proximity conductor 215 and between the contacts 382 and 383. The metal portion 379 is then engaged by the contacts 382 and 383 and the metal portions are heated to welding temperature. Thereafter, they are forged together along the length designated by the letter A either in the heating position or after the metal portions 379 and 380 have been moved to the right and from beneath the proximity conductor 215. When the metal portions are moved to the right, the length thereof designated by the letter B, which overlaps the lengths A and C, is beneath the proximity conductor 215 and the contacts 382 and 383. At this point the length designated by letter B is heated and forged in the same manner as the length designated by the letter A is welded together. Thereafter, the length designated by the letter C is placed beneath the proximity conductor 215 and the contacts 382 and 383 and heated and welded together in the same manner that the length A and B were welded together. In this way, a relatively long line of weld between two relatively long overlapping metal portions and consisting of a series of overlapping lines of weld may be produced.

FIG. 64 illustrates a further embodiment of the invention which is particularly useful for welding together the overlapping edge portions of relatively large tubes. The apparatus comprises a conductive anvil 385 which is connected by the lead 386 to one terminal of the high frequency source. Anvil 385 carries a movable contact 387 which is urged upwardly by a spring 388, and such contact is engageable with the lower surface of the part 393 of a hinge which also includes the part 391. The hinge part 391 is connected to the other terminal of the high frequency source by a lead 392. The other hinge part 393 may be raised or lowered by the piston 394 of a hydraulic or air cylinder 395. A strip 396 of high-temperature insulating material is secured to the lower surface of the part 393.

The hinge is shown in its open position and in this position, the metal strip 390 with the overlapping edge portions 389 and 397 may be inserted between the anvil 385 and the hinge part 393. Thereafter, the hinge part is lowered, causing the end thereof to engage the contact 387 and causing the insulating strip 396 to press against the overlapping edge portions 389 and 397. Current is then supplied to the hinge part 391 and the anvil 385, causing heating of the overlapping metal portions 389 and 390 to welding temperature in the manner previously described, the hinge part 393 acting as a proximity conductor, and when the portions 389 and 397 have been heated to welding temperature, they will be forged together by virtue of the pressure applied thereto by the hinge part 393.

The embodiment of the invention illustrated in FIGS. 65 and 66 has certain advantages over the embodiments previously described in that it permits the current-supplying means and the proximity conductor to be formed as a single unit. Such a construction maintains the proximity conductor in fixed relation to the current-supplying means, eliminates the need for sliding contacts, and permits all of the electrically conducting parts of the heating unit to be on the same side of the metal portions being heated.

In FIGS. 65 and 66, a pair of conductive bars 400 and 401 are joined together at their ends by a pair of conductive tiepieces 402 and 403. The proximity conductor 215 is conductively connected at one end to the tiepiece 402 and is connected at its other end to one terminal of the high frequency source. Tiepiece 403 is also connected to the other terminal of the high frequency source through the conductor 404. Water or other cooling fluid may be circulated through the bars and tiepieces through the conductor 404 and the proximity conductor 215. A metal strip 405 is shown in heating position and is supported from the support 406 having a recess therein so as to maintain the support 406 out of contact with the metal portions to be heated which are the overlapping metal portions of the lock seam 408.

In operation, the strip 405 is placed on the support 406 in the position shown, the bars 400 and 401 are pressed against strip 405 at the sides of the lock seam 408, and current is supplied to the bars 400 and 401 and the proximity conductor 215, thereby producing a flow of current in the overlapping metal portions in the manner previously described. After the overlapping metal portions are heated to welding temperature, bars 400 and 401 are raised and the metal portions may be forged together on the support 406 or they may be moved to another position and forged thereat.

The arrangement shown in FIGS. 65 and 66 has the further advantage that the current in the overlapping metal portions can flow to and from both the bars 400 and 401 to the ends of the lock seam 408, thereby reducing the current concentration at the ends and reducing the possibility that the ends will be overheated. Such advantage is, of course, also obtained with the other embodiment heretofore described in which a pair of current-supplying contacts are disposed on opposite sides of the ends of the overlapping metal portions.

In all of the various embodiments, the heating current normally will be discontinued prior to the time that the overlapping metal portions are forged together. However, in some cases it may be desirable to continue the heating during the forging of the metal portions. Also, if it is desired to heat treat or anneal the weld metal after the portions have been welded together, the weld metal may be heated in the heating unit using a current magnitude used for heating of the metal portions to welding temperature.

The expression "high frequency current" is intended to include not only current having a sine wave form but also other waveforms, such as pulses, which provide the effects and results described herein. Generally, frequencies at least as high as 3 kHz. will be used and for most applications will be in the range from 10 kHz. to 500 kHz.

The invention is applicable to the welding together of overlapping metal portions of the same or different thicknesses and of the same or different metals which may be welded together.

The basic principles of the invention also may be utilized in welding together two metal portions of given widths and positioned in stationary butting relationship along edges that extend in the direction of the width dimension of the metal portions. In the embodiments discussed immediately below the metal portions to be welded and the current applying contacts are stationary with respect to each other, at least during the heating of the metal portions.

FIGS. 67 and 68 illustrate a pair of metal portions 208 and 209 which may be the ends of a pair of metal strips of steel, aluminum, brass, etc. or the opposite edge portions of a single strip being joined to form a tube, supported on a conductive support 410 connected at one end through a conductor 411 which in turn is connected to a source 28 of high frequency current. The support 410 may, for example, be made of a high conductivity metal such as copper and is in conductive contact with the metal portions 208 and 209 at least at the ends 412 and 413 thereof.

The opposite end of the support 410 as at 414, is in conductive contact with a proximity conductor 215 which extends above and in close proximity to the edges of the metal portions 208 and 209 and to the other terminal of the high frequency source 28. Preferably the proximity conductor 215, the conductor 411, and the support 410 have passageways therethrough to permit the flow of a cooling fluid, such as water, therethrough.

In this embodiment of the invention, the edges of the metal portions 208 and 209 are maintained in contact with each other during the passage of current therethrough and hence, during the heating thereof. Thus, as shown in FIG. 68, force is applied to the metal portions 208 and 209 in the direction of the arrows 416 and 417 by any conventional means (not shown) so as to maintain the edges in butting contact during the heating thereof. Such conventional means preferably applies forge welding pressure to the edges during heating, but if desired, reduced pressure may be applied during heating and when the edges reach welding temperature, the force may be increased to forge weld the portions 208 and 209 together. The portions 208 and 209 are held against the support 410 by a pair of clamping bars 418 and 419 which are made of a material which will withstand the temperatures involved and may be made of either a conducting material or an insulating material. Preferably, the support 410 is provided with a lengthwise groove or cavity 420 so as to prevent current flow therein beneath the edges, so that the support 410 is not subjected to the high temperatures reached at the edges of the metal portions 208 and 209 and so as to provide room for any "squeeze-up" which may occur when the portions are forced together after being heated to welding temperature.

The proximity conductor is located as close as possible to the contacting edges consistent with providing the necessary insulation between the conductor 215 and the edges is flowing in one direction and the current in the proximity conductor is flowing in the opposite direction, and therefore, they must be insulated from each other. The insulation may be merely the air between them or a solid insulation which will withstand the welding temperatures may be employed. However, the spacing between the proximity conductor and the edges is kept as small as possible in order to obtain the maximum concentration of the current at the edges.

In the absence of the proximity conductor 215 or if the proximity conductor is not maintained close to the edges, the current would not be concentrated at the edges of the metal portions 208 and 209. Instead the current would spread out and follow paths determined by the impedances of the parts. Depending upon the location of the conductor which would be used in place of the proximity conductor and which would extend from the contact point 414 to the source 28, the current could flow in a wide ban on the metal portions 208 and 209 with slow heating of a wide area thereon or could flow almost entirely on the surface of the support 410 from the contact point 414 to the point at which the conductor 411 engages the support 410. However, due to the use of the proximity conductor 215, the lowest impedance path for the current becomes the portions of the metal portions 208 and 209 which are closest to the proximity conductor so that with the conductor located as shown in FIGS. 67 and 68 the maximum current flow will be along the edges of the metal portions and will have a distribution like that represented by the shaded area 421 in FIG. 68. Thus, the current from one terminal of the source 28 which is supplied to one end of the support 410 through the conductor 411 will first flow in the end portion of the support 410 and then leave the support and flow along the edges of the metal portions 208 and 209 to the opposite ends thereof and then renter the support 410. From the support the current will flow back to the other terminal of the source 28 by way of the proximity conductor 215. The current paths will be described in further detail in connection with FIG. 72.

It will be noted therefore that the current, rather than being widely distributed for flowing almost entirely on the support 410, will flow therein substantially only at the ends thereof, and due to the effect of the proximity conductor, will flow almost entirely at the butting edges of the metal portions 208 and 209 thereby heating such edges to welding temperature. Between the ends 412 and 413 of the metal portions there will be very little current flow in the support 410. In other words the proximity conductor 215 concentrates the current flow at the butting edges of the metal portions 208 and 209 where heating is desired. In this way, the edges are heated rapidly and efficiently to welding temperature along the full length thereof and when they have reached welding temperature, they are forge welded together by means of the forces applied in the directions of the arrows 416 and 417.

FIG. 69 illustrates a modified embodiment of the invention in which the proximity conductor 215 contacts the support 410 at the end thereof and is flattened adjacent to the ends 422a and 422b of the edges of the metal portions 208 and 209. If the current in the ends 422a and 422b is of the same magnitude as the current in the remainder of the edges, the ends may tend to overheat and therefore, under some circumstances, it may be desirable to reduce the concentration of the current at such ends. The concentration and distribution of the current in the metal portions 208 and 209 is affected by the shape of the proximity conductor 215, and by widening the proximity conductor as at 423 where it is adjacent the ends 422a and 422b, the current concentration at such ends can be reduced as compared to the remainder of the edges. The proximity conductor 215 may be similarly widened at the opposite ends of the metal portions 208 and 209 to reduce the current concentration in such opposite ends.

The relative concentration of the current at points along the metal portions underlying the proximity conductor depends upon the spacing of the proximity conductor with respect thereto, a wider spacing reducing the concentration. Accordingly, instead of shaping the proximity conductor as illustrated in FIG. 69, the heating at the ends 422a and 422b can be controlled by adjusting the spacing of the proximity conductor with respect thereto. Thus, if less heating of the ends is desired, the proximity conductor may be bent away from the metal portions 208 and 209 at such ends and vice versa. Similarly, if variable heating along the edges is desired, the spacing of the proximity conductor with respect to the edges may be correspondingly varied.

As shown in FIG. 70, the current may be supplied to the metal portions 208 and 209 by means of separate highly conductive bars 424 and 425 instead of by way of the support 410. For example, it may be desirable to make the support 410 of a strong high-temperature material and such material may not have a high conductivity. Therefore, the current may be supplied to the metal portions 208 and 209 by a pair of conducting bars 424 and 425 which may be made of copper. The bars 424 and 425 are conductively connected together at opposite ends and are connected to the high frequency source 28 in the same manner that the support 410 is connected thereto in FIGS. 67 and 68.

When bars 424 and 425 are used to supply the current to the metal portions 208 and 209, the metal portions may be held down by the clamping bars 418 and 419, which, as pointed out in connection with FIGS. 67 and 68, may be either conductive or nonconductive. When the clamping bars 418 and 419 are conductive, the spacing between such bars and the proximity conductor 215 should be substantially greater, e.g. at least five times greater, than the spacing between the proximity conductor and the edges of the metal portions to be heated. The purpose of such spacing is to reduce to a minimum the current flowing in the bars 418 and 419 as compared to the current flowing in the edges to be heated.

As a modification of the arrangement shown in FIG. 70, the bars 424 and 425 may be omitted and the clamping bars 418 and 419 may be made of highly conductive material such as copper and be used to supply the current to the metal portions 208 and 209. With such arrangement, the bars 418 and 419 would be electrically connected together at their ends and connected to the terminals of the source 28 in the same manner as the support 410 is shown connected thereto in FIG. 67. A further embodiment in which the clamping bars are used to supply the current to the butting metal portions 208 and 209 is shown in FIG. 72.

If the metal portions can be maintained in proper relation otherwise, the support 410, or the bars 424 and 425 or 418 and 419, whichever is used to supply the current to the metal portions, may be provided with projections which provide contact with the metal portions only at the ends thereof. For example, if bars 424 and 425 are used to supply the current, then they may be modified as shown in FIG. 71 which illustrates one bar 424a having a pair of projections 426 and 427 which engage the metal portion 208 at the opposite ends of its edges, the intermediate portion 428 being spaced from the portion 208. Bar 425 may be similarly modified for engagement with metal portion 209.

FIG. 72 illustrates in perspective one preferred embodiment of the invention in which the bars which supply the current to the metal portions 208 and 209 also aid in maintaining the metal portions in their proper positions and in which the current-supplying bars and the proximity conductor 215 are formed as a unit which may be raised and lowered with respect to the metal portions 208 and 209. The high conductivity current-supplying bars 430 and 431 are interconnected at their ends by a pair of high conductivity bars or tiepieces 432 and 433. Current is supplied to the bars 430 and 431 by a conductor 434 connected to one terminal of a high frequency source such as the source 28 by a flexible connection (not shown). The proximity conductor 215 is also connected to the other terminal of the high frequency source by a flexible connection and is secured to the tiepiece 433 substantially at the middle thereof. To provide cooling of the bars 430 and 431 and the proximity conductor 215, the conductor 434 and the proximity conductor 215 are hollow and the tiepieces 432 and 433 and the bars 430 and 431 have interconnecting passageways therethrough so as to permit cooling fluid to enter or leave by way of the conductor 434, pass through the tiepieces 432 and 433 and the bars 430 and 431, and enter or leave by way of the proximity conductor 215.

In use, the heating unit, comprising the bars 430 and 431 and the proximity conductor 215, is raised with respect to the support 410 so as to permit the metal portions 208 and 209 to be inserted therebetween with the edges in abutting relation. The heating unit is then lowered so as to clamp the metal portions between the support 410 and the bars 430 and 431, and pressure is applied to the metal portions 208 and 209 in the directions of the arrows 416 and 417, such pressure being at least sufficient to maintain the edges of the metal portions in firm contact and preferably being sufficient to forge the edges together when welding temperature is reached. Thereafter, the heating unit is energized by supplying high frequency current to the conductor 434 and the proximity conductor 215 and the current is maintained until the edges of the metal portions have reached the desired forge welding temperature. When such temperature is reached, the pressure applied in the directions of the arrows 416 and 417 produces a forge weld between the metal portions 208 and 209 and at their abutting edges. With current magnitudes which may be provided readily, the metal portions will reach welding temperature at their edges very rapidly and may, for example, reach such temperature within a fraction of a second. Normally, the heating current may be discontinued as soon as welding temperature is reached, but under some conditions it may be maintained during the application of forge welding pressure and discontinued after the weld has been made.

If it is desired to anneal or heat treat the weld after it has been made, the supply of current to the heating unit may be reduced rather than discontinued so as to provide lower temperature heating of the weld for the desired period of time. Alternatively, the current may be discontinued and then reapplied at a lower level while the work is in the unit to provide such heat treatment.

After the weld has been made and, if desired, annealed or heat treated, then the heating unit is raised, permitting the welded-together metal portions 208 and 209 to be removed from the apparatus.

The major current flow in the various parts shown in FIG. 72 is illustrated by the dotted lines extending along and from the conductor 434 in two directions along the tiepiece 432, along the bars 430 and 431, along the upper surfaces of the metal portions 208 and 209 adjacent the left ends thereof, along the upper surfaces of the metal portions adjacent the right edge thereof, along the bars 430 and 431 and from the bars along the tiepiece 433 to the proximity conductor 215. The current then returns to the other terminal of the high frequency source by way of the lower surface, that is, the surface nearest the metal portions 208 and 209 of the proximity conductor.

The relative distribution of the current at the edges of the metal portions 208 and 209 is indicated by the shaded area 435. It will be observed that the maximum current is adjacent the upper surfaces thereof nearest to the proximity conductor 215. With increasing depth in the metal, and hence as the distance from the proximity conductor increases, the relative magnitude of the current decreases. The heating of the edges which results from the application of the current depends upon the spacing between the proximity conductor 215 and the metal portions 208 and 209, the frequency of the current and the thermal conductivity of the metal portions. As pointed out above, the depth to which 86 percent of the current penetrates is dependent upon the frequency and the resistivity and relative permeability of the metal, and it is independent of the proximity effect. However, the proximity effect changes the relative distribution of the current within the penetration or reference depth. The heating of areas adjacent to the portions where most of the current flows is mainly dependent upon the thermal conductivity of the metal and the amount of time during which the current is applied. Accordingly, the portions of the edges nearest to the proximity conductor 215 will have the greatest current concentration and therefore will tend to heat most rapidly. However, portions farther away from the proximity conductor will also be heated by the current, and the depth at which relatively rapid heating by the current will be obtained can be controlled by selecting the frequency of the current. In addition, the depth to which heating to forge welding temperature is obtained can be adjusted by controlling the magnitude of the current and hence the amount of time during which heating of adjacent areas results from thermal conduction. Preferably, in order to obtain heating throughout the depth of the metal in a very short time and without overheating of the portions of the edges nearest the proximity conductor 215, the frequency is selected so as to provide a reference depth in the metal portions 208 and 209 which is between 0.5 and four times the thickness of the metal portions. By using current of such a frequency, 86 percent of the current flows at least through the upper half of the metal and the time of heating will be relatively short. The heating time may be decreased by using a frequency at which the reference depth approaches or exceeds the thickness of the metal, but if the reference depth exceeds the thickness of the metal by more than about 4 times, depending upon the methods and materials employed, then the efficiency of the welding process is substantially decreased because of the heating of the metal in areas where heating is not required. Accordingly, the welding becomes more difficult and the weld is not as satisfactory due to the fact that substantial volumes of metal are heated and it is difficult to control the weld obtained. Satisfactory butt welds between low carbon steel strips one-sixteenth inch thick have been made using frequencies of 450 kHz., and 10 kHz. but for such welding a frequency of 10 kHz. is preferred. At 450 kHz. and at the welding temperature, the penetration depth is 0.53 times the strip thickness and at 10 kHz. it is 3.6 times the strip thickness.

The principles of the invention may also be applied to the joining of edges which are not straight and to edges which are curved, corrugated or bowed. For example, the edges may be mating oppositely curved edges or mating sawtoothed edges. Also, the edges may lie in a single vertical plane, but they may be corrugated or curved in the direction of the plane. With such irregular configurations, the support and clamping devices would be suitably shaped to maintain the edges in the desired relationship and the proximity conductor would be shaped to conform to the shaping of the edges, i.e., to follow the configuration of the edges in close proximity to and with the desired spacing with respect thereto.

As a further means for concentrating the current at the edges of the metal portions being joined and to reduce the current in the clamping bars if they are conductive, magnetic elements 437 and 438 may be placed intermediate the proximity conductor 215 and the clamping bars 418 and 419 as illustrated in FIG. 73. The material selected for such elements 437 and 438 depends upon the frequency employed and would be a ceramic type of magnetic material for frequencies of 20 kHz. or higher and may be ordinary magnetic steel laminations of the type employed in medium frequency transformers for lower frequencies. Such magnetic elements serve in a well-known manner to increase the impedance of the metal to which it is adjacent so as to thereby reduce the current flowing in the adjacent metal.

Instead of separate magnetic elements 437 and 438 as shown in FIG. 73, a magnetic element 439 having a U-shaped recess for receiving the insulating proximity conductor 215 may be mounted as shown in FIG. 74. The ends of the arms on the element 439 extend to the metal portions 208 and 209 and cause the current to concentrate to an even greater extent at the edges of the metal portions 208 and 209.

It is also possible in the various embodiments of the invention to surround the edges with an inert gas such as argon during the welding of the edges when the metal employed is of a type which would be adversely affected by oxygen in the air. For example, in the embodiment shown in FIG. 74, an inert gas such as argon may be directed through the cavity 420 in the support 410 and in the space 440 below the proximity conductor 215 and between the arms of the magnetic element 439.

In the previously described embodiments, the weld between the edges was described as being produced by forcing the edges together by means of pressure applied to force the metal portions 208 and 209 toward each other. After the edges have reached welding temperature, they may instead be welded together by a technique known as dent welding in which the heated edges are pressed by a hammer or bar directed transversely to the surfaces of the metal portions. Thus, as shown in FIG. 75, the edges may be supported by an anvil 441 and, after they have reached welding temperature, be forged together by means of a forging hammer or bar 442. If the forging hammer or bar 442 is made of a material having good electrical conductivity, it may be the proximity conductor, being connected to the source and the current-supplying bars in the same manner as the proximity conductor 215, and may be insulated from the metal portions 208 and 209 by a strip of high-temperature insulation 443. If the penetration depth of the current is only slightly greater than or is less than the thickness of the metal portions 208 and 209, the anvil 441 may be made of a conductive material and may be used instead of separate conductive bars to supply the current to the metal portions 208 and 209. However, if desired, the current may be supplied to the metal portions 208 and 209 by separate conductive bars as described above and the anvil 441 may be made of an insulating material.

Alternatively, the edges may be heated as described above with one of the types of apparatus described above and thereafter the so heated edges may be moved in the direction of their length or transversely thereto to a separate anvil 441, preferably a heated anvil, where they are forged together by a forging hammer or bar 442 or by rolls. Since in such forging of the edges no current is flowing in the metal portions 208 and 209 at the time of forging, the insulating strip 443 may be omitted.

FIGS. 76 and 77 illustrate the application of the invention to the welding together of the opposite edges of a single strip 444, each of which has an upturned lip 445 and 446, to form a tube. Current is supplied to the upturned edges of the strip 444 by way of the conductive support 447 and the current and the heating is concentrated in the shaded area 448 by means of the proximity conductor 215. During the heating thereof, the lips 445 and 446 are pressed toward each other by squeeze bars 449 and 450 which, after welding temperature is reached, may also be used to forge weld together the lips 445 and 446. After welding and if desired, the lips may be mashed or rolled down in any conventional manner.

FIG. 78 is an end elevation view illustrating metal portions having downturned lips which may be welded together in substantially the same manner as the edges of the strip 444 described in connection with FIGS. 76 and 77. Strip 452 has a pair of downturned lips 453 and 454 which may be squeezed together by a pair of squeeze bars such as the squeeze bars 449 and 450 shown in FIG. 76 and will be heated in the shaded area 455 using the apparatus described in connection with FIGS. 76 and 77.

Instead of employing separate clamping bars and particularly when it is desired to weld together relatively thin sheets, the proximity conductor 215 may be mounted within a pressing bar 456 (FIG. 79) made of insulating material. Such pressing bar 456 engages and holds the workpieces against the support an anvil 457 during the heating of the workpieces, and after they have reached welding temperature they are forged together by the bar 456. To permit movement of the bar 456, the proximity conductor 215 is connected to the support 457 by a flexible connection (not shown).

Although applicable to the welding together of edges having various shapes, such as the shapes shown in the previous FIGS. the arrangement of FIG. 79 is particularly applicable to the welding together of relatively thin sheets which may have their edges folded as illustrated in FIG. 79. With the use of the pressing bar 456 and folded edges, the problem of butt welding together the edges of thin sheet is simplified.

FIG. 80 is an enlarged view of a portion of the apparatus shown in FIG. 79 and illustrates the welding together of folded edges of a single strip of thin metal to form a tube. Thus, the strip 461 has a pair of inwardly folded edges 462 and 463 which are held against the support or anvil 464 which has a curved upper surface. The edges are pushed toward each other by any conventional means (not shown) and are held against anvil 464 by the pressing bar 456. The area of heating is illustrated by the shading 465, and after the edges have reached welding temperature they are forged together by the pressing bar 456.

FIG. 81 illustrates the application of the invention to outwardly folded edges 466 and 467 of a strip 468, and the shading 469 indicates the area heated. Such heating and welding of the edges may be accomplished with the apparatus illustrated in FIGS. 79 and 80.

While the edges may be in abutting relation during the passage of current therethrough, it is also possible to accomplish the purposes of the invention with the edges separated in either the vertical or horizontal direction during the heating thereof. For example, as shown in FIG. 82, the metal portion 208 may be offset vertically with respect to the metal portion 209. Current is supplied to the metal portions by the conductive bars 472 and 473 which are connected to the high frequency current source and the proximity conductor in the manner illustrated in FIG. 72. However, due to the displacement of the edges 470 and 471 with respect to each other, the position of the proximity conductor 215 is shifted so as to obtain the desired distribution of the heating current and, as shown in FIG. 82, it is mounted so as to be approximately equidistant from the metal portions 208 and 209. The metal portion 209 is supported by a support 474, and preferably a magnetic 475 of the type described above is disposed adjacent the proximity conductor 215 so as to further concentrate the current near the edge 471, the element being nonconducting or insulated from the proximity conductor. With the arrangement shown in FIG. 82, current will be concentrated in the shaded areas 476 and 477, producing heating thereof to welding temperature and after welding temperature is reached, the edges may be forged together by means of the forging hammer or bar 478.

It will be noted that the arrangement of FIG. 82 has the further advantage that the proximity conductor 215 is displaced with respect to the edges of the metal portions in such a manner that it is unnecessary to move either of the metal portions or the heating apparatus when the edges have reached welding temperature in order to permit forging of the edges together by means of the hammer or bar 478.

In the various embodiments heretofore described and in those embodiments to be described hereinafter, the relative heating of the portions to be joined may be varied by varying the spacing of the proximity conductor with respect of the portions to be heated than to the other, such portion to which it is nearer will be subjected to a large amount of current, and therefore this effect can be used to control the relative heating of the metal portions. Such control is useful when it is desired to join dissimilar metals or portions of the same metal having different thicknesses. For example, in FIG. 82 if the metal portion 208 has a greater thickness than the metal portion 209 or requires a greater amount of heating current to reach the desired welding temperature by the time that the metal portion 209 has reached such temperature, the proximity conductor may be located closer to the edge 470 than to the metal portion 209.

Although the frequency chosen for the current used for heating the metal portions 208 and 209 when they are arranged as set forth in FIG. 82 is important in that it determines the depth from the edge surface 470 to which the metal portion 208 is heated and the depth below the upper surface of the metal portion 209 to which that metal portion is heated with in a predetermined time, nevertheless, due to the positioning of the proximity conductor 215 substantially the entire face of the edge surface 470 will be heated almost independently of the frequency of the current. Therefore, the frequency of the current will generally be selected so as to provide the desired depth of heating below the upper surface of the metal portion 209 and to provide the desired depth of heating to the left of the edge surface 470. Accordingly, the factors to be considered are somewhat different from those considered when welding together two portions which are side-by-side as illustrated in the previous figures. Similarly, when the metal portions being welded together have different thicknesses, the frequency will be selected so as to provide the desired depth of penetration in the thicker of the two metal portions but, by modifying the position of the proximity conductor with respect to the metal portions in the manner described above, the current distribution can be modified so that the reference depth may, instead of being 0.5 to four times the thickness of the thicker of the two metal portions, be 0.5 to four times the thickness of the thinner of the two metal portions.

As described heretofore, particularly in connection with FIG. 69, the current distribution in the metal portions or parts may be modified by suitably shaping the proximity conductor. It is also possible in the various embodiments to employ a plurality of proximity conductors electrically connected in parallel and located with respect to the metal portions so as to provide the desired current distribution and hence the desired current distribution and hence the desired heating. Thus, if a plurality of proximity conductors are employed, the current will tend to concentrate in a plurality of paths underlying the proximity conductors. As shown in FIG. 83, which illustrates a modified form of the apparatus shown in FIGS. 56 and 82 with the conductive bars 472 and 473 omitted for each in illustration, a second proximity conductor 479 may be located as shown so as to modify the current distribution adjacent the edges of the metal portions 208 and 209. Such proximity conductor 215 and will tend to increase the relative amount of current in the metal portion 208 in portions thereof spaced from the edge surface 470.

FIG. 84 illustrates in perspective one preferred form of the apparatus for butt welding together the ends of metal strip and is similar to the apparatus illustrated in FIGS. 68 and 70. In FIG. 84, the proximity conductor 215 is shown in broken lines and extends in close proximity to the spaced ends 480 and 480 of a pair of metal strips 208 and 209. One end of the proximity conductor 215 is conductively secured to a contact bar 484 which is pressed by any suitable means into contact with the conductive bars 485 and 486. The conductor 411 is also conductively secured to a bar 487 which is pressed against the conductive bars 485 and 486.

The strips 208 and 209 are held against the supports 488 and 489, which may be made of insulating or conducting material, by means of the conductive bars 485 and 486.

The strips 208 and 209 are held against the supports 488 and 489, which may be made of insulating or conducting material by means of the conductive bars 485 and 486.

Current from the high frequency source supplied by way of the conductor 411 divides at the contact bar 487 and flows in the end portions of the conductive bars 485 and 486. From such end portions the current flows to and along the spaced ends 480 and 481 of the strips 208 and 209 and then enters the opposite ends of the conductive bars 485 and 486 from which it flows into the contact bar 484 and then along the proximity conductor 215. The current is supplied with a magnitude and for a time sufficient to heat the ends 480 and 481 to forge welding temperature at which time they are forced together by pressure applied in the directions of the arrows 490 and 491, the pressure being sufficient to produce a forge weld between the ends 480 and 481. The conductor 411, the proximity conductor 215, the contact bars 484 and 487 and the conductive bars 485 and 486 are arranged so that they may be raised after the weld is made and so that the welded-together strips may be removed from the apparatus.

Although in the embodiment shown in FIG. 84 the ends 480 and 481 are spaced from each other during the heating thereof, it is to be understood that they may also be held in contacting relation during the heating thereof.

FIG. 85 illustrates in perspective an embodiment of the invention which may be used in butt welding together the opposite edges of a single metal strip to form a finite length of tubing. A metal strip 493 which has previously been formed with its edges in abutting relation is mounted between the pair of conductive clamps 494 and 495 which are pressed toward each other by any conventional means which applies pressure in the directions of the arrows 496 and 497 to hold the edges of the strip 493 in contacting and abutting relation during the heating of the edges. After the edges have reached forge welding temperature, the pressure on the clamps 494 and 495 causes a forge weld between the edges.

The electrical connections to the clamps are illustrated schematically and comprise a conductor 498 connected to the bridge between a pair of contacts 499 and 500 which engage the clamps 494 and 495 adjacent the portions thereof which are adjacent the edges to be welded. The electrical connections also comprise a bridge 501 which interconnects a pair of contacts 502 and 503 which similarly engage the clamps 494 and 495 at the opposite ends thereof. The bridge 501 is also conductively connected to one end of the proximity conductor 215 and the opposite end of the proximity conductor is connected to the high frequency source. Accordingly, the current flow in the clamps 494 and 495, the edges of the strip 493 and the proximity conductor 215 is the same as that described in connection with previously described embodiments. The embodiment in FIG. 85 is particularly useful for welding short lengths of tubing which may be moved into welding position and ejected from between the clamps 494 and 495 by conventional automatic means. Although a cylindrical tube is shown, it is apparent that the tube may be tapered, the clamps 494 and 495 having a corresponding shape.

FIG. 86 illustrates in perspective an embodiment of the invention which has been found to be satisfactory for the welding together of relatively thick metal portions. The metal portions 504 and 505 are held with their edges in abutting and contacting relation beneath a magnetic element 506, the lower surface of which may be in contact with the metal portions 504 and 505 or may be insulated therefrom such as by a paper tape or strips of mica. The metal portions preferably are pressed against conductive bars 507 and 508 by clamping bars similar to the clamping bars 418 and 419 shown in FIGS. 68 and 70. An anvil 509 of magnetic material is mounted intermediate the conductive bars 507 and 508 and beneath the metal portions 504 and 505. Anvil 509 has a groove 510 therein for the purposes heretofore described. The upper surface of the anvil 509 may be in contact with the metal portions 504 and 505 or, if desired, it may be insulated therefrom by thin insulation such as paper or mica strips.

When lower frequencies, such as frequencies of the order of 10,000 Hz. are used, the magnetic element 506 and the anvil 509 may be made of a plurality of magnetic steel laminations. The magnetic element 506 has a recess therein for receiving the proximity conductor 215 which is insulated therefrom, such as by being spaced from the element 506. The proximity conductor 215 is connected at one end to the high frequency source and at the other end to a conductive contact bar 511 which engages the conductive bars 507 and 508. The conductor 411 is connected to the high frequency source and to the conductive contact bar 512 which also engages the conductive bars 507 and 508.

As one example of an embodiment of the apparatus shown in FIG. 86 which has been used to weld together mild steel metal portions 504 and 505 having a thickness of one-sixteenth inch, the frequency of the current was 10,000 Hz. and it was found possible to satisfactorily forge weld together the metal portions 504 and 505 using approximately 110 kilowatts of power and a heating time of approximately 0.75 seconds. The length of the edges was approximately 10 inches, the welding pressure was in the range of 4,00 to 5,000 pounds, and therefore the pressure per square inch was approximately 7,000 pounds. The proximity conductor was made of three-sixteenth inch copper tubing located approximately one-sixteenth above the surface of the metal portions 504 and 505 and extending along the line of contact between the edges. The laminations forming of magnetic element 506 and the anvil 509 were made of magnetic steel approximately 0.007 inch thick and were insulated from each other by a coating of lacquer.

What I claim is:

1. The method for producing a line of weld between the facing surfaces of a pair of overlapping metal portions wherein said metal portions have predetermined thicknesses, permeabilities and resistivities, said method comprising, maintaining said surfaces in overlapping electrically conductive contact with each other at least at opposite ends of said line, causing high frequency current having a reference depth of penetration greater than one of said thicknesses to flow at said surfaces along said line from a first contact engaging one of said portions substantially at one end of said line to a second contact spaced from said first contact along said line and engaging one of said portions substantially at the other end of said line with a magnitude and for a time sufficient to cause said surfaces along such line and between the ends thereof to reach welding temperature and causing said current to flow in a direction opposite to the direction of current flow at said surfaces along a path insulated from said portions but in close proximity to said line and extending from said second contact to adjacent said first contact, the frequency of said current also being such that the effective contact resistances between the contacts and the metal engaged thereby and at the points of contact between said surfaces at the ends of said line are low as compared to the effective resistance of the metal between the ends of and along said line whereby the surfaces between the ends of and along said line reach welding temperature without overheating of the metal at the ends of said line and pressing said portions together along said line to form a weld between said portions extending along said line.

2. A method according to claim 1 wherein said contacts engage a surface of a portion opposite from said contacting surfaces and said reference depth is greater than the thickness of said last-mentioned portion whereby said current is caused to flow through the thickness of said last-mentioned portion.

3. A method according to claim 1 further comprising confining and increasing the concentration of the current at said surfaces by disposing magnetic elements adjacent tone of said portions with said elements extending longitudinally of said line but in spaced-apart relation on spaced-apart sides of said line.

4. A method according to claim 1 wherein said portions are parts of an interlocking seam and said current flows at least in a pair of the adjacent parts thereof.

5. A method according to claim 1 wherein said portions are parts of an interlocking seam having at least four layers of metal and wherein the frequency of said current is such that the reference depth thereof is greater than the thickness of two of said layers.

6. A method according to claim 1 further comprising rapidly advancing said portions in the direction extending from one contact toward the other while said current is flowing therein.

7. A method according to claim 1 further comprising rapidly advancing said portions in a direction transverse to at least a portion of said line.

8. A method according to claim 1 further comprising causing said contacts and said portions to move relative to each other while said current is flowing in said portions.

9. A method according to claim 8 further comprising intermittently supplying said current to said contacts whereby a succession of spaced-apart line welds are formed between said portions.

10. A method according to claim 1 wherein said portions are portions respectively of inner and outer walls of multiwall tubing and wherein said line extends both longitudinally and circumferentially of said tubing whereby a line weld is produced between the inner surface of said outer wall and the outer surface of said inner wall.

11. A method according to claim 1 wherein said line, and also said path, each has portions extending transversely to other portions thereof, and rapidly advancing said metal portions in the direction of at least one portion of said line and transverse to at least one other portion of said line while current is flowing in said metal portions.

12. A method according to claim 1 wherein said path is curved whereby said surfaces are heated to welding temperature along a curved line corresponding in shape to the curvature of said path.

13. A method for substantially simultaneously producing a pair of line welds between the surfaces between three metal portions in overlapping relation, each said surface being in electrically conductive contact with the adjacent surface at least at opposite ends of the desired line of the weld and said metal portion having predetermined thicknesses, permeabilities and resistivities, which method comprises: causing high frequency current having a reference depth greater than the combined thicknesses of two of said metal portions to flow at said surfaces along the lines of the desired welds from a first contact engaging one of said portions substantially at one end of the desired lines of weld to a second contact spaced from said first contact along said lines an engaging one of said portions substantially at the other end of the desired lines of weld with a magnitude and for a time sufficient to cause said surface along said lines and between the ends thereof to reach welding temperature and causing said current to flow in a direction opposite to the direction of current flow at said surfaces along a path insulated from said portions but in close proximity to said line and extending from said second contact to adjacent said first contact, the frequency of said current also being such that the effective resistances between the contacts and the metal engaged thereby and at the points of contact between said surfaces at the ends of said lines are low as compared to the effective resistances of the metal between the ends of and along said lines whereby the surfaces between the ends of and along said lines reach welding temperature without overheating of the metal at the ends of said lines; and pressing said portions together along said lines to form welds between said portions extending along said lines.

14. Method of welding together the facing surfaces of a pair of overlapping metal portions along a line which comprises maintaining said portions in overlapping conductive contact at the ends of the desired line of weld, supplying high frequency current to said portions at points adjacent said ends and which are in fixed relation thereto and provide current flows in the same direction along both said portions and at said line, conducting said current in the opposite direction along a proximity conductor extending along said line and in close proximity to but insulated from said portions, said current having a frequency which provides a reference depth greater than the thickness of the metal of the one of said portions which is intermediate said proximity conductor and the other of said portions and which provides heating of the metal along said line to the desired welding temperature without overheating of the metal at the ends of said line, maintaining such flow of current with a magnitude and for the time required to heat said portions along and throughout the length of said line to the desired welding temperature without overheating of the metal at the ends of said line and applying pressure to the heated said portions along the length of said line to forge weld them together along said line.

15. Method according to claim 14 in which said current has a frequency which provides a reference depth greater than the thickness of the metal portion nearer said proximity conductor.

16. Method according to claim 15 in which said current has a frequency which provides a reference depth less than the combined thicknesses of said metal portions.

17. Method according to claim 14 in which said pair of overlapping metal portions also overlaps at least one other metal portion and said other metal portion is maintained in contact with at least one of said pair of metal portions at least at said ends and in which said current has a frequency which provides a reference depth greater than the combined thicknesses of said pair of metal portions.

18. Method according to claim 14 in which the pressure applied to the heated portions is sufficient to reduce the thickness thereof to less than the combined thicknesses of said metal portions.

19. Method according to claim 18 in which said pressure is sufficient to reduce the thickness of the heated portions to a thickness substantially equal to the thickness of one of said metal portions.

20. Method according to claim 14 in which said overlapping metal portions are the opposite edge portions of a single strip.

21. Method according to claim 20 in which said opposite edge portions are mechanically interlocked.

22. Method according to claim 14 in which one of said metal portions is the side surface of a metal strip and the other portion is the edge surface of a metal strip.

23. Method according to claim 14 in which the metal portions are oppositely extending edge portions of metal strip and said proximity conductor is disposed to one side of the edge of one of said portions and in a position in which said last-mentioned one portion does not intervene between said proximity conductor and the other of said portions.

24. Method according to claim 14 in which said current is also conducted in said opposite direction along a second proximity conductor spaced from the first-mentioned proximity conductor and extending along said line and in close proximity to but insulated from said portions.

25. Method according to claim 14 wherein said portions are pressed together in the same position as that in which they are heated.

26. Method according to claim 14 wherein pressure is applied to said portions along the length of said line during the flow of current therein.

27. Method according to claim 14 wherein when said portions are heated to welding pressure, they are moved to a forging position different from the position in which current is supplied thereto and said pressure is applied to the heated said portions in said forging position.

28. Method according to claim 14 wherein said portions have a length which is the same as the length of said line.

29. Method according to claim 14 wherein said portions are longer than said line.

30. Method according to claim 14 wherein said current is supplied to a pair of points adjacent each of said ends, each of said pair of points being disposed on opposite sides of said line.

31. Method according to claim 30 wherein one of said pair of points is on a surface of one of said metal portions and the other of said pair of points is on a surface of the other of said metal portions.

32. Method according to claim 14 wherein said points are on the surface of the metal portion more remote from said proximity conductor than the other metal portion and said surface is other than a surface between said metal portions.

33. Method according to claim 14 wherein said points are on the same surface of one of said metal portions.

34. Apparatus for producing a line weld between a pair of overlapping metal portions comprising contact means for providing a first electrically conductive connection with one of said portions adjacent one end of said line and a second electrically conductive connection with one of said portions adjacent the opposite end of said line, means for maintaining said portions in conductive contact at least at said one and said opposite ends, a proximity conductor having an electrically conductive connection at one end thereof with said first connection and mounted to extend from adjacent said one end of said line along said line and in close proximity but in insulated relation to said portions to adjacent said opposite end of said line, means for connecting said contact means for providing said second connection to one terminal of a high frequency source providing current of a frequency such that the reference depth thereof is greater than the thickness of the metal intermediate said proximity conductor and the metal portion more remote from said proximity conductor and such that the metal along said line will reach welding temperature without overheating at the contact points, means for connecting a different terminal of said source to said proximity conductor so as to provide current flow therein opposite in direction to the current flow in said portions, means for maintaining said portions in fixed relation to each other and to said contact means during current flow therein, and means for forging said portions together along the length of said line when said portions reach forging temperature along the length of said line.

35. Apparatus as set forth in claim 34 further comprising means for engaging said metal portions along the length of said line and for maintaining said portions under pressure for forging them together during the heating thereof.

36. Apparatus as set forth in claim 34 wherein said forging means is made of electrical insulating material and is engageable with said metal portion along said line during the heating thereof.

37. Apparatus as set forth in claim 36 wherein said forging means comprises means for applying forge welding pressure to said metal portions along said line during the heating thereof.

38. Apparatus as set forth in claim 34 wherein the spacing of said proximity conductor with respect to the metal portions varies in the direction of the length of said proximity conductor.

39. Apparatus as set forth in claim 34 wherein said proximity conductor is disposed so that the metal portion nearer thereto is to one side of a straight line extending from said proximity conductor to the other metal portion.

40. Apparatus as set forth in claim 34 further comprising a second proximity conductor connected in parallel with and extending similarly to said first-mentioned proximity conductor, said first-mentioned and second proximity conductors being disposed on opposite sides of said line.

41. Apparatus as set forth in claim 40 wherein said first-mentioned and second proximity conductors are also disposed at the same side of one of said portions.

42. Apparatus as set forth in claim 40 wherein said first-mentioned and second proximity conductors are also disposed at opposite sides of one of said portions.

43. Apparatus as set forth in claim 34 wherein the shape of said proximity conductor, and hence the area of the surface thereof nearest said metal portions, varies in the direction of the length of said proximity conductor.

44. Apparatus as set forth in claim 34 wherein said proximity conductor has a pair of spaced, longitudinally extending surfaces which are nearer to said metal portions than the remainder of the proximity conductor.

45. Apparatus as set forth in claim 34 further comprising a magnetic element extending at least partly around said proximity conductor and adjacent at least one of said metal portions but displaced to the side of said line.

46. Apparatus as set forth in claim 34 wherein said forging means comprises a forging bar of insulating material extending around said proximity conductor.

47. Apparatus as set forth in claim 34 wherein said contact means comprises a conductive member extending at least for the length of said line and conductively engageable with a surface of one of said metal portions at least adjacent said ends.

48. Apparatus as set forth in claim 47 wherein said member is engageable with a surface of the metal portion which is more remote from said proximity conductor, said last-mentioned surface also being the surface of said last-mentioned portion which is more remote from said proximity conductor and which underlies the overlapping metal portion which is nearer to said proximity conductor.

49. Apparatus as set forth in claim 47 wherein said member is engageable with a surface of the metal portion which is nearer said proximity conductor said last-mentioned surface also being the surface of said last-mentioned portion which is nearer said proximity conductor but is a portion thereof spaced to one side of said line.

50. Apparatus as set forth in claim 34 wherein said contact means comprises a pair of conductive members extending at least for the length of said line and conductively engageable with said portions at least adjacent said ends, said members being disposed on opposite sides of said line and one said member being engageable with a surface of one of the metal portions and the other said member being engageable with a surface of the other of said metal portions.

51. Apparatus as set forth in claim 50 wherein said members engage the surfaces of said metal portions which are nearer said proximity conductor and are each spaced from said proximity conductor by a distance at least five times the spacing between said proximity conductor and the surface of the metal portion nearer thereto.

52. Apparatus as set forth in claim 34 wherein said proximity conductor comprises a pair of parts, one of said parts also forming part of said means for connecting said contact means for providing said second connection to said one terminal.

53. High frequency welding apparatus for welding together edge portions of metal strip which are in overlapping relation, said strip having a finite, predetermined width and a predetermined thickness and the desired weld being between the overlapping portions and extending along a line substantially equal in length to the width of said strip and said overlapping portions being in conductive contact at least at the ends of said line, said apparatus comprising contact means for providing a first contact conductively engaging said strip adjacent one of said ends and a second contact conductively engaging said strip adjacent the other of said ends, a proximity conductor extending along said line from one end to the other thereof and in close proximity but insulated relation to said portions, a source of current having a frequency such that the reference depth in the metal of said strip is greater than said thickness but such that the metal along said line will reach welding temperature without overheating the metal engaged by said contacts and at the points of contact between said portions, means connecting said proximity conductor and said first and second contacts to said source so that the current flow in said proximity conductor is opposite to the current flow in said portions, means for maintaining said portions in overlapping relation and in fixed relation to said first and second contacts during the flow of current therein, and forging means engageable with said portions for forging them together when forging temperature is reached along the length of said line.

54. Apparatus as set forth in claim 53 wherein said contact means comprises a conductive bar at least equal in length to the width of said strip and engaging the lowermost surface of the edge portion more remote from said proximity conductor.

55. Apparatus as set forth in claim 53 wherein said contact means comprises a conductive bar at least equal in length to the width of said strip and engaging the uppermost surface of said strip.

56. Apparatus as set forth in claim 53 wherein said contact means comprises a pair of spaced conductive bars each at least equal in length to the width of said strip and engaging the lowermost surface of said strip.

57. Apparatus as set forth in claim 53 wherein said contact means comprises a pair of spaced conductive bars each at least equal in length to the width of said strip and engaging the uppermost surface of said strip.

58. Apparatus as set forth in claim 57 wherein said bars are interconnected at both of their ends by respective conductive tiepieces and said proximity conductor is conductively secured at one end thereof to one of said tiepieces.

59. Apparatus as set forth in claim 53 wherein said contact means comprises a conductive anvil having a length at least equal to the width of said strip and engaging the lowermost surface of the metal portion which is more remote from said proximity conductor and said forging means comprises a bar having a length at least equal to the width of said strip and engaging the uppermost surface of the metal portion which is nearer said proximity conductor, and means for pressing said bar against said last-mentioned portion.

60. Apparatus as set forth in claim 59 wherein said bar is made of insulating material.

61. Apparatus as set forth in claim 59 wherein said bar is electrically insulated from said portions.

62. Apparatus as set forth in claim 53 wherein said forging means comprises a pair of rollers engageable with said portions, means for pressing said rollers toward each other and means for moving said portions between said rollers after they have reached welding temperature.

63. Apparatus as set forth in claim 53 wherein said forging means is displaced with respect to said proximity conductor and comprises an anvil and a forging bar for receiving said portions therebetween after they have been heated to welding temperature and means for forcing said bar against said portions.

64. High frequency welding apparatus for welding together edge portions of metal strip which are in overlapping relation, said strip having a finite, predetermined width and a predetermined thickness and the desired weld being between the overlapping portions and extending along a line substantially equal in length to the width of said strip and said overlapping portions being in conductive contact at least at the ends of said line, said apparatus comprising a conductive anvil for supporting said portions and engageable with the lowermost surface of the overlapped portions, a proximity conductor extending along said line from one end to the other thereof and in close proximity but insulated relation to said portions with said portions between said proximity conductor and said anvil, an insulating member extending between said proximity conductor and said portions, a source of current having a frequency such that the reference depth in the metal of said strip is greater than said thickness but such that the metal along said line will reach welding temperature without overheating the metal engaged at the points of contact between said portions, means conductively connecting one end of said anvil and one end of said proximity conductor together, means connecting the opposite ends of said anvil and said proximity conductor to said source and means for pressing said insulating member against said portions.

65. Apparatus for welding together two metal portions along a desired weld line, comprising:
- means for holding said two metal portions stationary and in contacting relationship with each other along the full extent of the desired completed weld line prior to being welded,
- electrically conductive means in stationary conductive contact with at least one of the metal portions at respective regions adjacent opposite ends of the desired weld line but transversely removed from the desired weld line,
- a source of high frequency welding current having first and second terminals,
- means for connecting one terminal of said source to said conductive means adjacent one end of the desired weld line at a location removed from the portions to be welded and for connecting the other terminal of said current source to said conductive means adjacent the opposite end of the desired weld line and at a location removed from the contacting portions to be welded,
- at least one of said connecting means extending along the desired weld line in stationary, closely spaced, but insulating relationship to the two contacting portions to be welded to provide proximity conductor means for causing welding current to flow in the same direction through the portions to be welded and along the desired weld line and for causing current flow in the proximity conductor means to be opposite in direction to the current flow along the desired weld line, thereby to concentrate said current in the region of the desired weld line, and
- means for applying a force to at least one of the contacting metal portions to simultaneously apply forge welding pressure completely along the desired completed weld line to forge weld said two portions,
- said means for holding the metal portions in stationary conductive contact being constructed and arranged to permit the forming of said forge weld.

66. Apparatus for welding together two metal portions along a desired weld line, comprising
- means for holding said two metal portions stationary prior to being welded and with one portion in butting contact along an edge thereof with the other portion, said butting contact being along the full extent of the desired completed weld line along which the portions are to be welded,
- electrically conductive means in stationary conductive contact with at least one of the metal portions at respective regions adjacent opposite ends of the desired weld line but transversely removed from the desired weld line,
- a source of high frequency welding current having first and second terminals,
- means for connecting one terminal of said source to said conductive means adjacent one end of the desired weld line at a location removed from the portions to be welded and for connecting the other terminal of said current source to said conductive means adjacent the opposite end of the desired weld line and at a location removed from the butting portions to be welded,
- at least one of said connecting means extending along the desired weld line in stationary, closely spaced, but insulating relationship to the butting portions to be welded to provide proximity conductor means for causing welding current to flow in the same direction through the butting portions along the desired weld line and for causing current flow in the proximity conductor means to be opposite in direction to the current flow along the desired weld line, thereby to concentrate said current in the region of the butting contact of said portions, and
- means for applying a force to at least one of the butting portions to simultaneously apply forge welding pressure completely along the desired completed weld line to forge weld the butting portions,
- said means for holding the two metal portions in stationary butting contact being constructed and arranged to permit the forming of said forge weld.

67. The apparatus claimed in claim 66 wherein said two portions to be welded are in edge to edge butting contact along the full extent of the desired completed weld lines, 68. Apparatus claimed in claim 67 wherein said proximity conductor means is a plurality of individual conductors spaced from each other.

69. Apparatus claimed in claim 67 wherein said electrically conductive means is on one side of the portions to be welded and the proximity conductor is on the opposite side of the portions.

70. Apparatus claimed in claim 67 wherein said proximity conductor means is comprised of two conductors, one end of each of the conductors being connected to said source and the opposite end of each conductor being connected to the conductive means adjacent respective ends of the desired completed weld line to be formed between the portions.

71. Apparatus claimed in claim 67 wherein said proximity conductor means is comprised of a single conductor extending substantially from end to end along the desired completed weld line to be formed between the portions.

72. Apparatus claimed in claim 67 wherein
- said electrically conductive means comprises at least one continuous bar that extends substantially completely along and closely adjacent the desired weld line, the bar contacting at least on e of the portions to be welded.

73. Apparatus claimed in claim 67 wherein said conductive means is comprised of a single bar that extends substantially completely along said desired weld line,
- said bar contacting both of said portions at least at both ends of the desired weld line, the bar being recessed in the region proximate the desired weld line to assure that the bar will not contact the weld formed between the members.

74. Apparatus claimed in claim 67 wherein said electrically conductive means is comprised of
- a pair of continuous bars that extend completely along the desired weld line on opposite transverse sides thereof,
- each of said bars being in electrical contact with a respective portion to be welded at least at regions at the opposite ends of the desired weld line.

75. Apparatus claimed in claim 67 and further including
- conductive tie bar means extending transversely between said bars at respective regions beyond the respective ends of the desired weld line,
- said means for connecting the terminals of said source to the conductive means being respectively connected to the tie bar means.

76. Apparatus claimed in claim 67 wherein said means for holding the two metal portions in stationary contacting relationship along the desired completed weld line includes
- stationary supporting means for supporting each of the portions to be welded at respective regions extending parallel to but transversely displaced from said desired weld line, and
- clamping means extending along respective transverse sides of the desired weld line and engaging the portions to be welded to force the two portions into stationary clamped relationship with said supporting means.

77. Apparatus claimed in claim 76 wherein either open of the clamping or supporting means is a continuous structure that is substantially a nonconductor of electricity and extends immediately adjacent, but spaced from, the desired weld line,
- said proximity conductor means extending along either one of the substantially nonconducting clamping or supporting means in spaced relation to the desired weld line.

78. Apparatus claimed in claim 76 wherein the supporting means comprises said electrically conductive means and couples welding current to the portions to be welded at respective regions thereof at opposite ends of the desired weld line.

79. Apparatus claimed in claim 76 wherein the clamping means comprises said electrically conductive means and couples welding current to the portions to be welded at respective regions thereof at opposite ends of the desired weld line.